United States Patent
Krinsky et al.

(10) Patent No.: US 9,838,531 B2
(45) Date of Patent: Dec. 5, 2017

(54) SYSTEMS AND METHODS FOR ESTABLISHING A DIAGNOSTIC TRANSMISSION MODE AND COMMUNICATING OVER THE SAME

(71) Applicant: TQ DELTA, LLC, Austin, TX (US)

(72) Inventors: David M. Krinsky, Acton, MA (US); Robert Edmund Pizzano, Jr., Stoneham, MA (US)

(73) Assignee: TQ DELTA, LLC, Austin, TX (US)

( * ) Notice: Subject to any disclaimer, the term of this patent is extended or adjusted under 35 U.S.C. 154(b) by 0 days.

(21) Appl. No.: 15/295,602

(22) Filed: Oct. 17, 2016

(65) Prior Publication Data
US 2017/0034343 A1 Feb. 2, 2017

Related U.S. Application Data

(63) Continuation of application No. 14/991,431, filed on Jan. 8, 2016, now Pat. No. 9,479,637, which is a
(Continued)

(51) Int. Cl.
*H04B 1/38* (2015.01)
*H04M 3/30* (2006.01)
(Continued)

(52) U.S. Cl.
CPC .............. *H04M 3/304* (2013.01); *H04B 3/46* (2013.01); *H04L 1/0001* (2013.01);
(Continued)

(58) Field of Classification Search
CPC ......... H04L 1/20; H04L 1/24; H04L 25/0262; H04L 1/002; H04L 17/006; H04L 1/009;
(Continued)

(56) References Cited

U.S. PATENT DOCUMENTS 3,836,726 A * 9/1974 Wells .................. H04W 84/022
340/7.25
4,351,059 A 9/1982 Gregoire et al.
(Continued)

FOREIGN PATENT DOCUMENTS

CA 2270721 A1 11/1999
CA 2394491 3/2011
(Continued)

OTHER PUBLICATIONS

U.S. Appl. No. 15/098,932, filed Apr. 14, 2016.
(Continued)

*Primary Examiner* — Khanh C Tran
(74) *Attorney, Agent, or Firm* — Jason H. Vick; Sheridan Ross, PC

(57) ABSTRACT

Upon detection of a trigger, such as the exceeding of an error threshold or the direction of a user, a diagnostic link system enters a diagnostic information transmission mode. This diagnostic information transmission mode allows for two modems to exchange diagnostic and/or test information that may not otherwise be exchangeable during normal communication. The diagnostic information transmission mode is initiated by transmitting an initiate diagnostic link mode message to a receiving modem accompanied by a cyclic redundancy check (CRC). The receiving modem determines, based on the CRC, if a robust communications channel is present. If a robust communications channel is present, the two modems can initiate exchange of the diagnostic and/or test information. Otherwise, the transmission power of the transmitting modem is increased and the initiate diagnostic link mode message re-transmitted to the receiving modem until the CRC is determined to be correct.

9 Claims, 2 Drawing Sheets

Related U.S. Application Data continuation of application No. 14/577,769, filed on Dec. 19, 2014, now abandoned, which is a continuation of application No. 14/153,282, filed on Jan. 13, 2014, now Pat. No. 8,929,423, which is a continuation of application No. 13/004,254, filed on Jan. 11, 2011, now Pat. No. 8,634,449, which is a continuation of application No. 12/779,708, filed on May 13, 2010, now Pat. No. 7,889,784, which is a continuation of application No. 12/477,742, filed on Jun. 3, 2009, now Pat. No. 7,835,430, which is a continuation of application No. 10/619,691, filed on Jul. 16, 2003, now Pat. No. 7,570,686, which is a continuation of application No. 09/755,173, filed on Jan. 8, 2001, now Pat. No. 6,658,052.

(60) Provisional application No. 60/224,308, filed on Aug. 10, 2000, provisional application No. 60/174,865, filed on Jan. 7, 2000.

(51) Int. Cl.

| | | |
|---|---|---|
| *H04B 3/46* | (2015.01) | |
| *H04L 1/00* | (2006.01) | |
| *H04L 1/08* | (2006.01) | |
| *H04L 1/18* | (2006.01) | |
| *H04L 1/24* | (2006.01) | |
| *H04L 5/14* | (2006.01) | |
| *H04L 27/26* | (2006.01) | |
| *H04M 3/22* | (2006.01) | |
| *H04L 27/34* | (2006.01) | |
| *H04M 3/28* | (2006.01) | |

(52) U.S. Cl.
CPC .............. *H04L 1/0061* (2013.01); *H04L 1/08* (2013.01); *H04L 1/18* (2013.01); *H04L 1/24* (2013.01); *H04L 1/245* (2013.01); *H04L 5/1438* (2013.01); *H04L 27/2601* (2013.01); *H04L 27/2602* (2013.01); *H04L 27/3461* (2013.01); *H04M 3/2209* (2013.01); *H04M 3/2227* (2013.01); *H04M 3/28* (2013.01); *H04M 3/30* (2013.01)

(58) Field of Classification Search
CPC ..... H04L 43/50; H04L 12/2697; H04L 43/00; H04B 3/46; H04B 17/00; H04B 3/32; H04M 11/06; H04M 11/062
USPC ........ 375/219–220, 222, 224–225, 227–228, 375/285; 370/252, 282, 241; 379/22.02, 379/22.04, 27.01, 27.03
See application file for complete search history.

(56) References Cited

U.S. PATENT DOCUMENTS

| | | | |
|---|---|---|---|
| 4,385,384 A | 5/1983 | Rosbury et al. | |
| 4,438,511 A | 3/1984 | Baran | |
| 4,566,100 A | 1/1986 | Mizuno et al. | |
| 4,679,227 A | 7/1987 | Hughes-Hartogs | |
| 4,833,706 A | 5/1989 | Hughes-Hartogs | |
| 4,979,174 A | 12/1990 | Cheng et al. | |
| 5,023,873 A * | 6/1991 | Stevenson | H04L 12/2697 |
| | | | 714/4.4 |
| 5,128,619 A | 7/1992 | Bjork et al. | |
| 5,214,501 A | 5/1993 | Cavallerano et al. | |
| 5,287,384 A | 2/1994 | Avery et al. | |
| 5,313,197 A * | 5/1994 | Barr | H04W 88/185 |
| | | | 340/7.21 |
| 5,351,016 A | 9/1994 | Dent | |
| 5,361,293 A | 11/1994 | Czerwiec | |
| 5,388,252 A * | 2/1995 | Dreste | G06F 11/2294 |
| | | | 714/46 |
| 5,420,640 A | 5/1995 | Munich et al. | |
| 5,422,913 A | 6/1995 | Wilkinson | |
| 5,438,329 A | 8/1995 | Gastouniotis et al. | |
| 5,521,906 A | 5/1996 | Grube et al. | |
| 5,533,008 A | 7/1996 | Grube et al. | |
| 5,549,512 A | 8/1996 | Sinclair et al. | |
| 5,581,228 A | 12/1996 | Cadieux et al. | |
| 5,596,604 A | 1/1997 | Cioffi et al. | |
| 5,608,643 A | 3/1997 | Wichter et al. | |
| 5,612,960 A * | 3/1997 | Stevens | H04L 12/26 |
| | | | 714/712 |
| 5,635,864 A | 6/1997 | Jones | |
| 5,675,585 A | 10/1997 | Bonnot et al. | |
| 5,694,466 A | 12/1997 | Xie et al. | |
| 5,745,275 A | 4/1998 | Giles et al. | |
| 5,751,338 A | 5/1998 | Ludwig, Jr. | |
| 5,764,649 A | 6/1998 | Tong | |
| 5,764,693 A | 6/1998 | Taylor et al. | |
| 5,790,550 A | 8/1998 | Peeters et al. | |
| 5,793,759 A | 8/1998 | Rakib et al. | |
| 5,812,786 A | 9/1998 | Seaholtz et al. | |
| 5,835,527 A | 11/1998 | Lomp | |
| 5,838,268 A | 11/1998 | Frenkel | |
| 5,862,451 A | 1/1999 | Grau et al. | |
| 5,864,602 A | 1/1999 | Needle | |
| 5,903,612 A | 5/1999 | Van Der Putten et al. | |
| 5,905,874 A | 5/1999 | Johnson | |
| 5,910,970 A | 6/1999 | Lu | |
| 5,917,340 A | 6/1999 | Manohar et al. | |
| 5,964,891 A | 10/1999 | Caswell et al. | |
| 5,995,539 A | 11/1999 | Miller | |
| 6,005,893 A | 12/1999 | Hyll | |
| 6,011,970 A * | 1/2000 | McCarthy | H04W 16/02 |
| | | | 455/436 |
| 6,041,057 A | 3/2000 | Stone | |
| 6,052,411 A | 4/2000 | Mueller et al. | |
| 6,064,692 A | 5/2000 | Chow | |
| 6,065,060 A | 5/2000 | Liu et al. | |
| 6,072,779 A | 6/2000 | Tzannes et al. | |
| 6,073,179 A | 6/2000 | Liu et al. | |
| 6,075,821 A | 6/2000 | Kao et al. | |
| 6,081,291 A | 6/2000 | Ludwig, Jr. | |
| 6,128,335 A | 10/2000 | Liu et al. | |
| 6,144,696 A | 11/2000 | Shively et al. | |
| 6,151,328 A | 11/2000 | Kwon et al. | |
| 6,154,489 A | 11/2000 | Kleider et al. | |
| 6,169,728 B1 * | 1/2001 | Perreault | H04H 20/42 |
| | | | 348/E7.07 |
| 6,175,934 B1 | 1/2001 | Hershey et al. | |
| 6,177,801 B1 | 1/2001 | Chong | |
| 6,188,717 B1 | 2/2001 | Kaiser et al. | |
| 6,219,378 B1 | 4/2001 | Wu | |
| 6,226,322 B1 | 5/2001 | Mukherjee | |
| 6,249,543 B1 | 6/2001 | Chow | |
| 6,252,900 B1 | 6/2001 | Liu et al. | |
| 6,253,060 B1 | 6/2001 | Komara et al. | |
| 6,266,347 B1 | 7/2001 | Amrany et al. | |
| 6,308,278 B1 | 10/2001 | Khouli et al. | |
| 6,359,926 B1 | 3/2002 | Isaksson et al. | |
| 6,363,109 B1 | 3/2002 | Polley et al. | |
| 6,363,128 B1 | 3/2002 | Isaksson et al. | |
| 6,366,554 B1 | 4/2002 | Isaksson et al. | |
| 6,366,644 B1 | 4/2002 | Sisk et al. | |
| 6,385,773 B1 * | 5/2002 | Schwartzman | H04L 12/2801 |
| | | | 348/E7.07 |
| 6,404,774 B1 | 6/2002 | Jenness | |
| 6,411,678 B1 | 6/2002 | Tomlinson, Jr. et al. | |
| 6,421,323 B1 | 7/2002 | Nelson et al. | |
| 6,424,674 B1 | 7/2002 | Linz et al. | |
| 6,434,119 B1 | 8/2002 | Wiese et al. | |
| 6,438,174 B1 | 8/2002 | Isaksson et al. | |
| 6,442,211 B1 | 8/2002 | Hampel et al. | |
| 6,445,730 B1 | 9/2002 | Greszczuk et al. | |
| 6,445,773 B1 | 9/2002 | Liang et al. | |
| 6,449,307 B1 | 9/2002 | Ishikawa et al. | |
| 6,456,649 B1 | 9/2002 | Isaksson et al. | |
| 6,459,678 B1 | 10/2002 | Herzberg | |

(56) References Cited

U.S. PATENT DOCUMENTS

| | | |
|---|---|---|
| 6,473,418 B1 | 10/2002 | Laroia et al. |
| 6,473,467 B1 | 10/2002 | Wallace et al. |
| 6,493,395 B1 | 12/2002 | Isaksson et al. |
| 6,512,789 B1 | 1/2003 | Mirfakhraei |
| 6,516,027 B1 * | 2/2003 | Kapoor ............... H04L 5/1438 375/227 |
| 6,532,215 B1 | 3/2003 | Muntz |
| 6,578,162 B1 | 6/2003 | Yung |
| 6,590,893 B1 | 7/2003 | Hwang et al. |
| 6,606,719 B1 | 8/2003 | Ryckebusch et al. |
| 6,631,120 B1 | 10/2003 | Milbrandt |
| 6,633,545 B1 | 10/2003 | Milbrandt |
| 6,636,505 B1 | 10/2003 | Wang et al. |
| 6,636,603 B1 | 10/2003 | Milbrandt |
| 6,640,239 B1 | 10/2003 | Gidwani |
| 6,646,994 B1 | 11/2003 | Hendrichs et al. |
| 6,657,949 B1 | 12/2003 | Jones, IV et al. |
| 6,658,052 B2 | 12/2003 | Krinsky et al. |
| 6,686,879 B2 | 2/2004 | Shattil |
| 6,690,655 B1 | 2/2004 | Miner et al. |
| 6,697,626 B1 | 2/2004 | Eidson et al. |
| 6,725,176 B1 | 4/2004 | Long et al. |
| 6,748,212 B2 | 6/2004 | Schmutz et al. |
| 6,754,290 B1 | 6/2004 | Halter |
| 6,781,513 B1 | 8/2004 | Korkosz et al. |
| 6,788,705 B1 | 9/2004 | Rango |
| 6,801,570 B2 | 10/2004 | Yong |
| 6,829,307 B1 | 12/2004 | Hoo et al. |
| 6,847,702 B1 | 1/2005 | Czerwiec et al. |
| 6,865,232 B1 | 3/2005 | Isaksson et al. |
| 6,891,803 B1 | 5/2005 | Chang et al. |
| 6,892,339 B1 | 5/2005 | Polk, Jr. et al. |
| 6,898,185 B1 | 5/2005 | Agazzi et al. |
| 6,904,537 B1 | 6/2005 | Gorman |
| 6,996,067 B1 | 2/2006 | Burke et al. |
| 7,024,592 B1 | 4/2006 | Voas et al. |
| 7,042,900 B2 | 5/2006 | Czerwiec et al. |
| 7,120,122 B1 | 10/2006 | Starr et al. |
| 7,200,138 B2 | 4/2007 | Liu |
| 7,203,206 B2 | 4/2007 | Amidan et al. |
| 7,336,627 B1 | 2/2008 | Hasegawa et al. |
| 7,400,688 B2 | 7/2008 | Garrett |
| 7,570,686 B2 | 8/2009 | Krinsky et al. |
| 7,835,430 B2 | 11/2010 | Krinsky et al. |
| 7,889,784 B2 | 2/2011 | Krinsky et al. |
| 8,238,412 B2 | 8/2012 | Krinsky et al. |
| 8,432,956 B2 | 4/2013 | Krinsky et al. |
| 8,634,449 B2 | 1/2014 | Krinsky et al. |
| 8,743,931 B2 | 6/2014 | Krinsky et al. |
| 8,929,423 B2 | 1/2015 | Krinsky et al. |
| 9,264,533 B2 | 2/2016 | Krinsky et al. |
| 9,319,512 B2 | 4/2016 | Krinsky et al. |
| 9,479,637 B2 | 10/2016 | Krinsky et al. |
| 2002/0015401 A1 | 2/2002 | Subramanian et al. |
| 2002/0181665 A1 | 12/2002 | Belge et al. |
| 2003/0014536 A1 | 1/2003 | Christensen et al. |
| 2003/0131209 A1 | 7/2003 | Lee |
| 2004/0120435 A1 | 6/2004 | Yang et al. |
| 2005/0079889 A1 | 4/2005 | Vaglica et al. |
| 2015/0103936 A1 | 4/2015 | Krinsky et al. |
| 2016/0165042 A1 | 6/2016 | Krinsky et al. |
| 2016/0227026 A1 | 8/2016 | Krinsky et al. |

FOREIGN PATENT DOCUMENTS

| | | |
|---|---|---|
| EP | 0486229 A2 | 5/1992 |
| EP | 0820168 A2 | 1/1998 |
| EP | 0889615 | 1/1999 |
| EP | 0905948 A2 | 3/1999 |
| EP | 0957615 A2 | 11/1999 |
| EP | 0815655 B1 | 3/2005 |
| EP | 1119775 B1 | 5/2013 |
| GB | 2300546 | 11/1996 |
| GB | 2303032 | 2/1997 |
| GB | 2319703 | 5/1998 |
| JP | 60-206346 | 10/1985 |
| JP | Hei6-003956 | 1/1994 |
| JP | A-Hei10-513622 | 12/1998 |
| JP | A-Hei11-508417 | 7/1999 |
| JP | A-Hei11-261665 | 9/1999 |
| JP | A-Hei11-317723 | 11/1999 |
| WO | WO 86/07223 | 12/1986 |
| WO | WO 96/24995 | 8/1996 |
| WO | WO 97/01256 | 1/1997 |
| WO | WO 97/01900 | 1/1997 |
| WO | WO 98/10546 | 3/1998 |
| WO | WO 98/47238 | 10/1998 |
| WO | WO 99/18701 | 4/1999 |
| WO | WO 99/20027 | 4/1999 |
| WO | WO 99/26375 | 5/1999 |
| WO | WO 99/63427 | 12/1999 |
| WO | WO 99/67890 | 12/1999 |
| WO | WO 00/41395 | 7/2000 |
| WO | WO 00/64130 | 10/2000 |
| WO | WO 00/72583 | 11/2000 |
| WO | WO 01/11833 | 2/2001 |

OTHER PUBLICATIONS

U.S. Appl. No. 15/016,432, filed Feb. 5, 2016.
U.S. Appl. No. 14/577,769, filed Dec. 19, 2014.
U.S. Appl. No. 60/078,549, filed Mar. 19, 1998, Jacobsen et al.
Bauer, Rainer et al. "Iterative Source/Channel-Decoding Using Reversible Variable Length Codes" Munich University of Technology, 2000 (10 pages).
Boets et al., "Modeling Aspect of Transmission Line Networks," Proceedings of the Instrumentation and Measurement Technology Conference, US, New York, IEEE, May 12, 1992, pp. 137-141, XP000343913 ISBN: 0-7803-0640-6.
Broadband Forum—Technical Report "TR-024: DMT Line Code Specific MIB" Jun. 1999 (14 pages).
Business Wire "New FatPipe T1 Speed Product Produces Speeds up to 4.5Mbps and Redundancy for a Fraction of the Cost of a Fractional T3!" Business Wire, Oct. 16, 1998 (2 pages).
Chow, Peter S. et al. "Performance Evaluation of a Multichannel Transceiver System for ADSL and VHDSL Services" IEEE Journal on Selected Areas in Communications, vol. 9, No. 6, Aug. 1991. (11 pages).
Cioffi, John M., ADSL Maintenance with DMT, T1E1.4 ADSL Project, Amati Communications Corporation, Dec. 1, 1992, pp. 1-14.
Cisco Systems, Inc. "Alternatives for High Bandwidth Connections Using Parallel T1/E1 Links" 1998 (8 pages).
Cordes, Mikael et al. "Synchronization in ADSL Modems" Lund Institute of Technology, Dec. 1998 (53 pages).
Goodman, David et al. "Maximizing the Throughput to CDMA Data Communications" Polytechnic University, Brooklyn, NY; IEEE Vehicular Technology Conference, Oct. 2003 (5 pages).
ITU-T Recommendation G.992.1. "Asymmetric Digital Subscriber Line (ADSL) Transceivers," Jun. 1999. (256 pages).
ITU-T Recommendation G.992.2, "Splitterless asymmetric digital subscriber line ( ADSL) transceivers," International Telecommunication Union, Jun. 1999, 179 pages.
ITU-T Recommendation G.992.3, "Asymmetric Digital Subscriber Line Transceivers 2 (ADSL2) " International Telecommunication Union, Apr. 2009, 404 pages.
ITU-T Recommendation G.992.3 Annex C, "Annex C: Specific Requirements for an ADSL System Operating in the Same Cable as ISDN as Defined in Appendix III of Recommendation ITU-T G.961" International Telecommunication Union, Apr. 2009, 296 pages.
ITU-T Recommendation G.994.1, "Handshake procedures for digital subscriber line (DSL) transceivers," International Telecommunication Union, Jun. 1999, 56 pages.
ITU—Telecommunication Standardization Sector—Draft ANSI Standard T1-413-1998 "Courtesy Copy—ANSI T1.413 Issue 2 Letter Ballot" Jun. 5, 1998 (278 pages).

(56) References Cited

OTHER PUBLICATIONS

ITU-T Telecommunication Standard: T1E1.4 "T1.413 Issue 2" May 4, 1998 (259 pages).
ITU-T Telecommunication Standard: T1E1.4/98-007R4 "Standards Project for Interfaces Relating to Carrier to Customer Connection of Asymmetrical Digital Subscriber Line (ADSL) Equipment" "ANSI"—T1.412 Issue 2, Jun. 12, 1998 (269 pages).
Jacobsen, Krista et al. "Providing the Right Solution for VDSL" Texas Instruments White Paper, Jul. 1999, Version 1.05 (35 pages).
Johns, David A., et al. "Integrated Circuits for Data Transmission Over Twisted-Pair Channels" IEEE Journal of Solid-State Circuits, vol. 32, Nov. 3, Mar. 1997 (9 pages).
Lewis et al., "Extending Trouble Ticket System to Fault Diagnostics," IEEE Network, IEEE Inc. New York, US, Nov. 1, 1993, pp. 44-51, XP 000575228.
Milanovic, Stanislav et al. "ATM Over ADSL Probe in a Telecom Italia Environment" Computer Networks 34 (2000) 965-980 (16 pages).
Petzold, Mark C. et al. "Multicarrier Spread Spectrum Performance in Fading Channels with Serial Concatenated Convolutional Coding" IEEE 1998 (4 pages).
Pottie, Gregory J. "Wireless Multiple Access Adaptive Communications Techniques" Electrical Engineering Department, University of California, Los Angeles, 1999. (54 pages).
Saltzberg "Comparison of Single-Carrier and Multitone Digital Modulation for ADSL Applications" IEEE Communications Magazine, Nov. 1998 (8 pages).
Sklower, K. et al. "The PPP Multilink Protocol (MP)" Network Working Group, Nov. 1994 (15 pages).
Wolman, Alec et al. "Latency Analysis of TCP on an ATM Network" University of Washington, Printed Sep. 19, 2014 (14 pages).
International Search Report for PCT/US01/00418 dated Jul. 16, 2001, 4 pages.
Written Opinion for International (PCT) Patent Application No. PCT/US01/00418, dated Jan. 18, 2002, 2 pages.
International Preliminary Examination Report for International (PCT) Patent Application No. PCT/US01/00418, completed Mar. 9, 2002, 2 pages.
PCT International Search Report dated Oct. 9, 2002 for PCT/US01/41653.
Examiner's First Report for Australian Patent Application No. 27669/01, dated Apr. 2, 2004.
Notice of Acceptance for Australian Patent Application No. 27669/01, dated Aug. 6, 2004.
Examiner's First Report for Australian Patent Application No. 2004203321, dated Nov. 16, 2006.
Notice of Acceptance for Australian Patent Application No. 2004203321, dated Aug. 7, 2008.
Examiner's First Report for Australian Patent Application No. 2008203520, dated Mar. 9, 2009.
Notice of Acceptance for Australian Patent Application No. 2008203520, dated Jul. 9, 2009.
Examination Report for Australian Patent Application No. 2009222537, dated Mar. 21, 2011.
Examination Report for Australian Patent Application No. 2009222537, dated May 27, 2011.
Notice of Acceptance for Australian Patent Application No. 2009222537, dated Aug. 25, 2011.
Examination Report for Australian Patent Application No. 2011247879, dated Aug. 5, 2013.
Notice of Acceptance for Australian Patent Application No. 2011247879, dated May 21, 2014.
Notice of Acceptance for Australian Patent Application No. 2014208320 dated Nov. 19, 2014.
First Examination Report for Australian Patent Application No. 2015200087 dated Feb. 24, 2016.
Official Action for Canadian Patent Application No. 2,394,491, dated Nov. 24, 2009.
Notice of Allowance for Canadian Patent Application No. 2,394,491, dated Jul. 16, 2010.

Official Action for Canadian Patent Application No. 2,726,826, dated Jun. 30, 2011.
Notice of Allowance for Canadian Patent Application No. 2,726,826, dated Mar. 1, 2012.
Official Action for Canadian Patent Application No. 2,788,662, dated Aug. 14, 2014.
Official Action for Canadian Patent Application No. 2,788,662, dated Jun. 30, 2015.
Notice of Allowance for Canadian Patent Application No. 2,788,662, dated May 16, 2016.
Official Action for European Patent Application No. 01901808.4, dated Dec. 1, 2004.
Official Action for European Patent Application No. 01901808.4, dated Sep. 14, 2005.
Communication about intention to grant a European patent for European Patent Application No. 01901808.4, dated May 15, 2006.
European Search Report for European Patent Application No. EP 06022008 completed Jan. 8, 2007.
Official Action for European Patent Application No. EP 06022008,4, dated Sep. 20, 2007.
Official Action for European Patent Application No. EP 06022008, dated Apr. 23, 2010.
Official Action for European Patent Application No. EP 06022008, dated Jul. 7, 2010.
Communication Under Rule 71(3) EPC for European Patent Application No. EP 06022008, dated Apr. 4, 2011.
European Search Report for European Patent Application No. 10011985.8 dated Feb. 26, 2014.
Communication Pursuant to Rule 69 EPC for European Patent Application No. 10011985.8 dated Mar. 31, 2014.
European Search Report for European Patent Application No. 10011983.3, dated Mar. 17, 2014.
Communication Pursuant to Rule 69 EPC European Patent Application No. 10011983,3, dated Apr. 23, 2014.
European Search Report for European Patent Application No. 10011984.1 dated Mar. 3, 2014.
Communication Pursuant to Rule 69 EPC for European Patent Application No. 10011984.1 dated Apr. 7, 2014.
European Search Report for European Patent Application No. 10011982.5, dated Feb. 11, 2014.
Communication Pursuant to Rule 69 EPC for European Patent Application No. 10011984.1 dated Mar. 17, 2014.
Notification of Reasons (including translation) for Refusal for Japanese Patent Application No. 2001-552611, dated Dec. 7, 2009.
Official Action (including translation) for Japanese Patent Application No. 2001-552611, dated Aug. 2, 2010.
Official Action (including translation) for Japanese Patent Application No. 2001-552611, dated Mar. 28, 2011.
Official Action (including translation) for Japanese Patent Application No. 2008-191051, dated Jul. 26, 2010.
Notice of Allowance for Japanese Patent Application No. 2008-190051, dated Mar. 14, 2011.
Official Action (including translation) for Japanese Patent Application No. 2011-012155 dated Jun. 4, 2012.
Decision of Refusal (including translation) for Japanese Patent Application No. 2011-012155, dated Feb. 25, 2013.
Decision to Grant Patent (including translation) for Korean Patent Application No. 10-2002-7008794, dated Dec. 1, 2006.
Official Action for U.S. Appl. No. 09/755,173, dated Jun. 20, 2002.
Official Action for U.S. Appl. No. 09/755,173, dated Sep. 24, 2002.
Official Action for U.S. Appl. No. 09/755,173, dated Mar. 14, 2003.
Notice of Allowance for U.S. Appl. No. 09/755,173, dated Jul. 1, 2003.
Official Action for U.S. Appl. No. 10/619,691, dated Oct. 31, 2006, 14 pages.
Official Action for U.S. Appl. No. 10/619,691, dated Mar. 30, 2007, 11 pages.
Official Action for U.S. Appl. No. 10/619,691, dated Jun. 13, 2008, 7 pages.
Official Action for U.S. Appl. No. 10/619,691, dated Oct. 20, 2008, 11 pages.
Notice of Allowance for U.S. Appl. No. 10/619,691, dated May 15, 2009, 9 pages.

(56) References Cited

OTHER PUBLICATIONS

Supplemental Notice of Allowability for U.S. Appl. No. 10/619,691, dated Jul. 6, 2009, 5 pages.
Official Action for U.S. Appl. No. 12/477,742, dated Jun. 8, 2010, 10 pages.
Official Action for U.S. Appl. No. 12/477,742, dated Aug. 16, 2010, 9 pages.
Notice of Allowance for U.S. Appl. No. 12/477,742, dated Sep. 7, 2010, 6 pages.
Office Action for U.S. Appl. No. 12/779,660, dated Mar. 19, 2012.
Notice of Allowance for U.S. Appl. No. 12/779,660, dated Apr. 26, 2012.
Official Action for U.S. Appl. No. 12/779,708, dated Sep. 29, 2010, 6 pages.
Official Action for U.S. Appl. No. 12/779,708, dated Dec. 15, 2010, 6 pages.
Notice of Allowance for U.S. Appl. No. 12/779,708, dated Jan. 3, 2011, 6 pages.
Official Action for U.S. Appl. No. 13/004,254, dated Dec. 4, 2012.
Official Action for U.S. Appl. No. 13/004,254, dated Aug. 15, 2013.
Notice of Allowance for U.S. Appl. No. 13/004,254, dated Nov. 25, 2013.
Official Action for U.S. Appl. No. 13/476,310, dated Nov. 5, 2012.
Notice of Allowance for U.S. Appl. No. 13/476,310, dated Jan. 4, 2013.
Official Action for U.S. Appl. No. 13/873,892, dated Aug. 13, 2013.
Official Action for U.S. Appl. No. 13/873,892, dated Oct. 17, 2013.
Notice of Allowance for U.S. Appl. No. 13/873,892, dated Mar. 26, 2014.
Official Action for U.S. Appl. No. 14/153,282, dated Feb. 27, 2014.
Notice of Allowance for U.S. Appl. No. 14/163,282, dated Sep. 19, 2014.
Official Action for U.S. Appl. No. 14/282,254, dated Mar. 27, 2015.
Official Action for U.S. Appl. No. 14/282,254, dated Sep. 3, 2015.
Notice of Allowance for U.S. Appl. No. 14/282,254, dated Feb. 12, 2016.
Official Action for U.S. Appl. No. 14/577,769, dated Feb. 5, 2015.
Official Action for U.S. Appl. No. 14/577,769, dated Jul. 9, 2015.
Official Action for U.S. Appl. No. 14/818,731, dated Sep. 21, 2015.
Notice of Allowance for U.S. Appl. No. 14/818,731, dated Nov. 20, 2015.
Notice of Allowance for U.S. Appl. No. 14/818,731, dated Dec. 14, 2015.
Official Action for U.S. Appl. No. 14/991,431, dated Mar. 21, 2016.
Notice of Allowance for U.S. Appl. No. 14/991,431, dated Jul. 20, 2016.
Official Action for U.S. Appl. No. 15/016,432, dated Apr. 18, 2016.
Official Action for U.S. Appl. No. 15/098,932, dated Jun. 1, 2016.
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed from Nov. 4, 2013-Oct. 19, 2015—Docket Nos. 1-122; (3,844 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed from Nov. 10, 2015-Jan. 5, 2016—Docket Nos. 123-129; (102 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed from Jan. 20, 2016-Feb. 2, 2016—Docket Nos. 131-137; (104 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed from Feb. 9, 2016-Mar. 2, 2016—Docket Nos. 138-157; (228 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed from Aug. 31, 2015 and Mar. 17, 2016-Apr. 22, 2016—Docket Nos. 108 and 180-208; (194 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed on Feb. 25, 2016, made publically available on May 25, 2016 Docket No. 155 (40 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed from Apr. 27, 2016-May 24, 2016; Docket Nos. 209-226; (813 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed on Mar. 6, 2016—made publically available Jun. 1, 2016 Docket Nos. 158; (61 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed from Jun. 3, 2016-Jun. 6, 2016; Docket Nos. 227-228; (67 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed on Jun. 27, 2016; Docket Nos. 229; (2 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed on Aug. 2-Sep. 14, 2016; Docket Nos. 230-236; (58 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed on Sep. 26, 2016; Docket Nos. 238-239; (19 pages).
Defendant 2Wire, Inc.'s Preliminary Invalidity Contentions with Regard to Representative Asserted Claims for *TQ Delta, LLC v. 2Wire, Inc.*—Including Claim Charts for Family 1 as Exhibits A-1 to A-8; B-1 to B7; C-1 to C-7; and D-1 to D-7; in the United States ; District Court for the District of Delaware; Civil Action No. 13-01835-RGA; filed Sep. 24, 2015 (281 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Nov. 4, 2013-Nov. 30, 2015—Docket Nos. 1-100; (1722 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Dec. 16, 2015-Jan. 6, 2016—Docket Nos. 104-112; (193 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Jan. 20, 2016-Feb. 8, 2016—Docket Nos. 113-124; (252 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Feb. 9, 2016-Mar. 2, 2016—Docket Nos. 125-142; (225 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Mar. 17, 2016-Apr. 22, 2016; Docket Nos. 165-193; (152 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Feb. 25, 2016, made publically available May 25, 2016; Docket No. 140; (40 pages).

(56) References Cited

OTHER PUBLICATIONS

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Apr. 27, 2016-May 24, 2016; Docket Nos. 194-211; (813 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Mar. 3, 2016 made publically available Jun. 1, 2016; Docket Nos. 143; (61 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Jun. 3, 2016-Jun. 7, 2016; Docket Nos. 212-215; (138 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Jun. 27, 2016; Docket Nos. 216; (2 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Aug. 2-Aug. 23, 2016; Docket Nos. 217-219; (9 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Sep. 16, 2016; Docket Nos. 220; (2 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Sep. 26, 2016; Docket Nos. 221-222; (19 pages).
Defendant Zhone Technologies, Inc.'s Invalidity Contentions with Regard to Representative Asserted Claims for *TQ Delta, LLC v. Zhone Technologies, Inc.*—Including Claim Charts for Family 1 as Exhibits 1-30; in the United States District Court for the District of Delaware; Civil Action No. 13-01836-RGA; filed Sep. 25, 2015 (330 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 9, 2013-Nov. 30, 2015—Docket Nos. 1-117; (1996 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 16, 2015-Dec. 16, 2015—Docket Nos. 119; (48 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jan. 20, 2016-Feb. 8, 2016—Docket Nos. 125-139; (349 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Feb. 9, 2016-Mar. 2, 2016; Docket Nos. 140-157; (223 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Mar. 17, 2016-Apr. 22, 2016; Docket Nos. 180-208; (152 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Feb. 25, 2016, made publically available May 25, 2016; Docket No. 155; (40 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Apr. 27, 2016-May 24, 2016; Docket Nos. 209-226; (809 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Mar. 3, 2016, made publically Jun. 1, 2016; Docket No. 158; (61 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 3, 2016-Jun. 13, 2016; Docket Nos. 227-232; (140 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 14, 2016; Docket Nos. 233; (2 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Jun. 27, 2016; Docket Nos. 235; (2 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Aug. 2, 2016-Sep. 1, 2016; Docket Nos. 236-239; (11 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Sep. 26, 2016; Docket Nos. 240-241; (19 pages).
Defendant Zyxel's Initial Invalidity Contentions with Respect to Representative Asserted Claims for *TQ Delta, LLC v. Zyxel Communications, Inc. and Zyxel Communications Corporation*—Including Claim Charts for Family 1 as Exhibits A1-A29: In the United States District Court for the District of Delaware; Civil Action No. 13-02013-RGA; filed Sep. 25, 2015 (285 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 17, 2014-Oct. 19, 2015—Docket Nos. 1-65; (2,489 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jan. 20, 2016-Feb. 8, 2016—Docket Nos. 67-68; (81 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 9, 2016-Mar. 1, 2016 Docket Nos. 69-72; (13 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 28, 2016-May 31, 2016—Docket Nos. 74-77; (8 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 8, 2016, made publically available Jun. 6, 2016 Docket No. 73; (60 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jun. 7, 2016-Jun. 8, 2016; Docket Nos. 78-80; (73 pages).

(56) References Cited

OTHER PUBLICATIONS

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jun. 15, 2016; Docket Nos. 81; (2 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed on Jun. 27, 2016; Docket Nos. 82; (2 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Aug. 2-Sep. 1, 2016; Docket Nos. 83-86; (11 pages).
Defendant Adtran, Inc.'s Preliminary Invalidity Contentions with Regard to Representative Asserted Claims for *TQ Delta, LLC v. Adtran, Inc.*—Including Claim Charts for Family 1 as Exhibits 1-1-1-29; U.S, District Court, for the District of Delaware (Wilmington); Civil Action No. 1:14-cv-00954-RGA and Civil Action No. 1:15-cv-00121-RGA; filed Feb. 9, 2016 (323 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Jul. 17, 2014-Mar. 1, 2016 Docket Nos. 1-77; (1,444) pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Mar. 28, 2016-May 31, 2016; Docket Nos. 79-82; (8 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents on Mar. 8, 2016 made publically available Jun. 6, 2016; Docket Nos. 78; (60 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Jun. 7, 2016-Jun. 8, 2016; Docket Nos. 83-85; (73 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Jun. 15, 2016; Docket Nos. 86; (2 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed on Jun. 27, 2016; Docket Nos. 87; (2 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Aug. 2-Sep. 1, 2016; Docket Nos. 88-91; (11 pages).
Documents filed with District Court Proceedings for *Adtran Inc. vs. TQ Delta, LLC*; U.S. District Court, for the Northern District of Alabama (Northeastern); Civil Action No. 5:14-cv-01381-JEO; Includes documents filed from Jul. 17, 2014-Jan. 27, 2015—Docket Nos. 1-32; (568 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Jul. 17, 2015-Nov. 6, 2015 Docket Nos. 1-20; (338 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Nov. 13, 2015-Dec. 11, 2015 Docket Nos. 21-30; (89 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Dec. 18, 2015-Jan. 7, 2016 Docket Nos. 31-36; (13 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Jan. 14, 2016-Feb. 5, 2016 Docket Nos. 37-45; (356 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Feb. 19, 2016-Mar. 4, 2016 Docket Nos. 46-48; (93 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Mar. 23, 2016-Apr. 22, 2016—Docket Nos. 49-54; (25 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Apr. 29, 2016-May 27, 2016 Docket Nos. 59-75; (722 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Jun. 10, 2016-Jun. 17, 2016—Docket Nos. 83-94; (180 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Jun. 24, 2016-Jul. 25, 2016; Docket Nos. 95-108; (299 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes Transcript made available Aug. 1, 2016; Docket No. 62 (63 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes Transcript made available Sep. 13, 2016; Docket No. 86 (26 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes Transcript made available Sep. 13, 2016; Docket No. 87 (72 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Aug. 4-Sep. 13, 2016; Docket Nos. 109-133; (390 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Sep. 16, 2016; Docket Nos. 134-135 (2 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Sep. 20-Oct. 10, 2016; Docket Nos. 136-156 (1476 pages).
Documents filed with District Court Proceedings for *TQ Delta, LLC v. Coxcom LLC et al.*; U.S, District Court, for the District of Delaware (Wilmington); Civil Action No. 1:15-cv-00612-RGA; Includes documents filed from Jul. 17, 2015-Nov. 13, 2015—Docket Nos. 1-21; (353 pages).
Documents filed with District Court Proceedings for *TQ Delta, LLC v. Coxcom LLC et al.*; U.S, District Court, for the District of Delaware (Wilmington); Civil Action No. 1:15-cv-00612-RGA; Includes documents filed from Nov. 18, 2015-Jan. 6, 2016—Docket Nos. 22-34; (95 pages).

(56) References Cited

OTHER PUBLICATIONS

Documents filed with District Court Proceedings for *TQ Delta, LLC v. Coxcom LLC et al.*; U.S, District Court, for the District of Delaware (Wilmington); Civil Action No. 1:15-cv-00612-RGA; Includes documents filed from Jan. 14, 2016-Feb. 5, 2016—Docket Nos. 35-45 (361 pages).

Documents filed with District Court Proceedings for *TQ Delta, LLC v. Coxcom LLC et al.*; U.S, District Court, for the District of Delaware (Wilmington); Civil Action No. 1:15-cv-00612-RGA; Includes documents filed from Feb. 19, 2016-Mar. 4, 2016; Docket Nos. 46-48 (93 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Mar. 23, 2016-Apr. 22, 2016; Docket Nos. 49-53 (23 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Apr. 29, 2016-May 27, 2016; Docket Nos. 58-72 (716 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Jun. 6, 2016-Jun. 17, 2016; Docket Nos. 74-92 (182 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Jun. 24, 2016-Jul. 25, 2016; Docket Nos. 93-106 (299 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes Transcript made available Aug. 1, 2016; Docket No. 61 (63 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes Transcript made available Sep. 13, 2016; Docket No. 84 (26 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes Transcript made available Sep. 13, 2016; Docket No. 85 (72 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Aug. 4-Sep. 13, 2016; Docket Nos. 107-130 (387 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Sep. 16, 2016; Docket Nos. 131-132 (2 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Sep. 20-Oct. 10, 2016; Docket Nos. 133-150 (1476 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Jul. 17, 2015-Nov. 23, 2015—Docket Nos. 1-23; (460 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Nov. 23, 2015-Jan. 6, 2016—Docket Nos. 24-35; (45 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Jan. 19, 2016-Feb. 4, 2016—Docket Nos. 36-45; (358 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Feb. 16, 2016-Mar. 4, 2016; Docket Nos. 46-50; (99 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Mar. 23, 2016-Apr. 25, 2016; Docket Nos. 51-60; (33 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Apr. 29, 2016-May 27, 2016; Docket Nos. 65-79; (716 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Jun. 9, 2016-Jun. 17, 2016; Docket Nos. 85-102; (186 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Jun. 24, 2016-Jul. 25, 2016; Docket Nos. 103-116; (299 pages).

Documents filed with District Court Proceedings for *TQ Delta, LLC v. Directv LLC*; U.S. District Court, for the District of Delaware (Wilmington); Civil Action No. 1:15-cv-00613-RGA; Includes Transcript made available Aug. 1, 2016; Docket No. 68 (63 pages).

Documents filed with District Court Proceedings for *TQ Delta, LLC v. Directv LLC*; U.S. District Court, for the District of Delaware (Wilmington); Civil Action No. 1:15-cv-00613-RGA; Includes Transcript made available Sep. 13, 2016; Docket No. 93 (26 pages).

Documents filed with District Court Proceedings for *TQ Delta, LLC v. Directv LLC*; U.S. District Court, for the District of Delaware (Wilmington); Civil Action No. 1:15-cv-00613-RGA; Includes Transcript made available Sep. 13, 2016; Docket No. 94 (72 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Aug. 4, 2016-Sep. 9, 2016; Docket Nos. 117-137; (385 pages).

Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Sep. 20-Oct. 10, 2016; Docket Nos. 138-15; (1345 pages).

Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Jul. 17, 2015-Nov. 23, 2015—Docket Nos. 1-28; (583 pages).

Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Nov. 30, 2015-Jan. 5, 2016—Docket Nos. 29-36; (22 pages).

Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Jan. 19, 2016-Feb. 5, 2016 Docket Nos. 37-48; (365 pages).

Documents filed with District Court Proceedings for *TQ Delta, LLC v. Dish Network Corporation et al.*; U.S. District Court, for the District of Delaware (Wilmington); Civil Action No. 1:15-cv-

(56) References Cited

OTHER PUBLICATIONS

00614-RGA; Includes documents filed from Feb. 19, 2016-Mar. 7, 2016; Docket Nos. 49-52; (95 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Mar. 23, 2016-Apr. 25, 2016; Docket Nos. 54-59; (23 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Apr. 29, 2016-May 27, 2016; Docket Nos. 64-82; (856 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Jun. 2, 2016-Jun. 10, 2016; Docket Nos. 83-93; (23 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Jun. 15, 2016-Jun. 17, 2016; Docket Nos. 95-104; (178 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Jun. 24, 2016-Jul. 15, 2016; Docket Nos. 105-114; (217 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes Transcript made available Aug. 1, 2016; Docket No. 67 (63 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes Transcript made available Sep. 13, 2016; Docket No. 96 (26 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes Transcript made available Sep. 13, 2016; Docket No. 97 (72 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Aug. 10, 2016-Sep. 9, 2016; Docket Nos. 115-131; (195 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Sep. 21-Oct. 10, 2016; Docket Nos. 132-142; (1304 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Jul. 17, 2015-Nov. 24, 2015— Docket Nos. 1-23; (415 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Nov. 30, 2015-Jan. 6, 2016—Docket Nos. 24-32; (24 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Jan. 14, 2016-Feb. 5, 2016; Docket Nos. 33-43; (361 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Feb. 19, 2016-Mar. 4, 2016; Docket Nos. 44-46; (93 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Mar. 23, 2016-Apr. 22, 2016; Docket Nos. 47-51; (23 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Apr. 29, 2016-May 27, 2016; Docket Nos. 56-71; (718 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Jun. 6, 2016-Jun. 17, 2016; Docket Nos. 73-91; (182 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Jun. 24, 2016-Jul. 25, 2016; Docket Nos. 92-106; (302 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes Transcript made available Aug. 1, 2016; Docket No. 59 (63 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes Transcript made available Sep. 13, 2016; Docket No. 83 (26 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes Transcript made available Sep. 13, 2016; Docket No. 84 (72 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Aug. 4, 2016-Sep. 13, 2016; Docket Nos. 107-129; (383 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Sep. 16, 2016; Docket Nos. 130-131; (2 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Sep. 20-Oct. 13, 2016; Docket Nos. 132-151; (1520 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Jul. 17, 2015-Nov. 18, 2015— Docket Nos. 1-22; (432 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Nov. 23, 2015-Jan. 7, 2016—Docket Nos. 23-36; (32 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Jan. 14, 2016-Feb. 5, 2016—Docket Nos. 37-45; (354 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Feb. 19, 2016-Mar. 4, 2016; Docket Nos. 46-48; (93 pages).

(56) References Cited

OTHER PUBLICATIONS

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Mar. 23, 2016-Apr. 22, 2016; Docket Nos. 49-55; (21 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed on Apr. 13, 2016 and from Apr. 29, 2016-May 27, 2016; Docket Nos. 51; and 60-74; (721 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed on Apr. 13, 2016 and from Jun. 6, 2016-Jun. 17, 2016; Docket Nos. 76-95; (184 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Jun. 24, 2016-Jul. 25, 2016; Docket Nos. 96-110; (298 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes Transcript made available Aug. 1, 2016; Docket No. 63 (63 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes Transcript made available Sep. 13, 2016; Docket No. 87 (26 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes Transcript made available Sep. 13, 2016; Docket No. 88 (72 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Aug. 4, 2016-Sep. 14, 2016; Docket Nos. 111-134; (386 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Sep. 16, 2016; Docket Nos. 135-136; (2 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Sep. 20-Oct. 13, 2016; Docket Nos. 137-156; (1520 pages).
Petition for Inter Partes Review of U.S. Pat. No. 7,835,430, including Exhibits 1001-1050, Case No. IPR2016-00428, filed Jan. 2, 2016 (1,411 pages).
Notice of Filing Date Accorded to Petition and Time for Filing Patent Owner Preliminary Response for *Arris Group, Inc. v. TQ Delta, LLC*, United States Patent and Trademark Office—Before the Patent Trial and Appeal Board, Case No. IPR 2016-00428 filed Jan. 12, 2016 (5 pages).
Patent Owner's Mandatory Notices Pursuant to 37 C.F.R. § 42.8(a)(2) for *Arris Group, Inc. v. TQ Delta, LLC*, United States Patent and Trademark Office—Before the Patent Trial and Appeal Board, Case No. IPR 2016-00428 filed Jan. 25, 2016 (6 pages).
Patent Owner's Preliminary Response Pursuant to 37 C.F.R. § 42.8(a)(2) for *Arris Group, Inc. v. TQ Delta, LLC*, United States Patent and Trademark Office—Before the Patent Trial and Appeal Board, Case No. IPR 2016-00428 filed Apr. 12, 2016 (169 pages).
Decision Denying Institution of Inter Partes Review 37 C.F.R. § 42,108 for *Arris Group, Inc. v. TQ Delta, LLC*, United States Patent and Trademark Office—Before the Patent Trial and Appeal Board, Case No. IPR 2016-00428 filed Jun. 22, 2016 (17 pages).
Request for Rehearing Under 37 C.F.R. § 42.71(c)-(d) for *Arris Group, Inc. v. TQ Delta, LLC*, United States Patent and Trademark Office—Before the Patent Trial and Appeal Board, Case No. IPR 2016-00428 filed Jul. 22, 2016 (19 pages).
Decision Denying Petitioner's Request for Rehearing 37 C.F.R. § 42.71 for *Arris Group, Inc. v. TQ Delta, LLC*, United States Patent and Trademark Office—Before the Patent Trial and Appeal Board, Case No. IPR 2016-00428 filed Aug. 23, 2016 (6 pages).
Petition for Inter Partes Review of U.S. Pat. No. 8,238,412, including Exhibits 1001-1020, Case No. IPR2016-00430, filed Jan. 3, 2016 (696 pages).
Notice of Filing Date Accorded to Petition and Time for Filing Patent Owner Preliminary Response for *Arris Group, Inc. v. TQ Delta, LLC*, United States Patent and Trademark Office—Before the Patent Trial and Appeal Board, Case No. IPR 2016-00430 filed Jan. 13, 2016 (5 pages).
Patent Owner's Mandatory Notices Pursuant to 37 C.F.R. § 42.8(a)(2) for *Arris Group, Inc. v. TQ Delta, LLC*, United States Patent and Trademark Office—Before the Patent Trial and Appeal Board, Case No. IPR 2016-00430 filed Jan. 25, 2016 (6 pages).
Patent Owner's Preliminary Response Pursuant to 37 C.F.R. § 42,8(a)(2) for *Arris Group, Inc. v. TQ Delta, LLC*, United States Patent and Trademark Office—Before the Patent Trial and Appeal Board, Case No. IPR 2016-00430 filed Apr. 13, 2016 (167 pages).
Corrected Patent Owner's Preliminary Response Pursuant to 37 C.F.R. § 42.8(a)(2) for *Arris Group, Inc. v. TQ Delta, LLC*, United States Patent and Trademark Office—Before the Patent Trial and Appeal Board, Case No. IPR 2016-00430 filed Apr. 18, 2016 (64 pages).
Decision Denying Institution of Inter Partes Review 37 C.F.R. § 42.108 for *Arris Group, Inc. v. TQ Delta, LLC*, United States Patent and Trademark Office—Before the Patent Trial and Appeal Board, Case No. IPR 2016-00430 filed Jul. 1, 2016 (15 pages).
Request for Rehearing Under 37 C.F.R. § 41.71(c)-(d) for *Arris Group, Inc. v. TQ Delta, LLC*, United States Patent and Trademark Office—Before the Patent Trial and Appeal Board, Case No. IPR 2016-00430 filed Jul. 29, 2016 (17 pages).
Decision Denying Petitioner's Request for Rehearing 37 C.F.R. § 42.71 for *Arris Group, Inc. v. TQ Delta, LLC*, United States Patent and Trademark Office—Before the Patent Trial and Appeal Board, Case No. IPR 2016-00430 filed Aug. 29, 2016 (6 pages).
Petition for Inter Partes Review of U.S. Pat. No. 8,432,956, including Exhibits 1001-1026, Case No. IPR2016-00429, filed Jan. 3, 2016 (794 pages).
Notice of Filing Date Accorded to Petition and Time for Filing Patent Owner Preliminary Response for *Arris Group, Inc. v. TQ Delta, LLC*, United States Patent and Trademark Office—Before the Patent Trial and Appeal Board, Case No. IPR 2016-00429 filed Jan. 13, 2016 (5 pages).
Patent Owner's Mandatory Notices Pursuant to 37 C.F.R. § 42.8(a)(2) for *Arris Group, Inc. v. TQ Delta, LLC*, United States Patent and Trademark Office—Before the Patent Trial and Appeal Board, Case No. IPR 2016-00429 filed Jan. 25, 2016 (6 pages).
Patent Owner's Preliminary Response Pursuant to 37 C.F.R. § 42.8(a)(2) for *Arris Group, Inc. v. TQ Delta, LLC*, United States Patent and Trademark Office—Before the Patent Trial and Appeal Board, Case No. IPR 2016-00429 filed Apr. 13, 2016 (167 pages).
Decision Denying Institution of Inter Partes Review 37 C.F.R. § 42,108 for *Arris Group, Inc. v. TQ Delta, LLC*, United States Patent and Trademark Office—Before the Patent Trial and Appeal Board, Case No. IPR 2016-00429 filed Jun. 30, 2016 (17 pages).
Request for Rehearing Under 37 C.F.R. § 42.71(c)-(d) for *Arris Group, Inc. v. TQ Delta, LLC*, United States Patent and Trademark Office—Before the Patent Trial and Appeal Board, Case No. IPR 2016-00429 filed Jul. 27, 2016 (18 pages).
Decision Denying Petitioner's Request for Rehearingfor *Arris Group, Inc. v. TQ Delta, LLC*, United States Patent and Trademark Office—Before the Patent Trial and Appeal Board, Case No. IPR 2016-00429 filed Sep. 28, 2016 (7 pages).

(56) References Cited

OTHER PUBLICATIONS

Petition for Inter Partes Review of U.S. Pat. No. 7,835,430, including Exhibits 1001-1023, Case No. IPR2016-01006, filed May 6, 2016 (4199 pages).
Notice of Filing Date Accorded to Petition and Time for Filing Patent Owner Preliminary Response for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed May 12, 2016 (5 pages).
Patent Owner's Mandatory Notices Pursuant to 37 C.F.R. § 42.8(a)(2) for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed May 27, 2016 (9 pages).
Patent Owner's Preliminary Response for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Aug. 12, 2016 (37 pages).
Petition for Inter Partes Review of U.S. Pat. No. 8,432,956, including Exhibits 1001-1023, Case No. IPR2016-01007, filed May 6, 2016 (4207 pages).
Notice of Filing Date Accorded to Petition and Time for Filing Patent Owner Preliminary Response for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed May 12, 2016 (5 pages).
Notice of Accepting Corrected Petition for *Cisco Systems, Inc.* v. *TQ Delta, LLC*, United States Patent and Trademark Office—Before the Patent Trial and Appeal Board, Case No. IPR 201601007 (U.S. Pat. No. 8,432,956) filed May 16, 2016 (2 pages).
Patent Owner's Mandatory Notices Pursuant to 37 C.F.R. § 42.8(a)(2) for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed May 27, 2016 (9 pages).
Patent Owner's Preliminary Response for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Aug. 12, 2016 (46 pages).
Petition for Inter Partes Review of U.S. Pat. No. 8,238,412, including Exhibits 1001-1023, Case No. IPR2016-01008, filed May 6, 2016 (4286 pages).
Notice of Filing Date Accorded to Petition and Time for Filing Patent Owner Preliminary Response for *Cisco Systems, Inc.* v. *TQ Delta, LLC*, United States Patent and Trademark Office—Before the Patent Trial and Appeal Board, Case No. IPR 2016-01008 (U.S. Pat. No. 8,238,412) filed May 12, 2016 (5 pages).
Notice of Accepting Corrected Petition for *Cisco Systems, Inc.* v. *TQ Delta, LLC*, United States Patent and Trademark Office—Before the Patent Trial and Appeal Board, Case No. IPR 2016-01008 (U.S. Pat. No. 8,238,412) filed May 16, 2016 (2 pages).
Patent Owner's Mandatory Notices Pursuant to 37 C.F.R. § 42.8(a)(2) for *Cisco Systems, Inc.* v. *TQ Delta, LLC*, United States Patent and Trademark Office—Before the Patent Trial and Appeal Board, Case No. IPR 2016-01008 (U.S. Pat. No. 8,238,412) filed May 27, 2016 (9 pages).
Patent Owner's Preliminary Response for *Cisco Systems, Inc.* v. *TQ Delta, LLC*, United States Patent and Trademark Office—Before the Patent Trial and Appeal Board, Case No. IPR 2016-01008 (U.S. Pat. No. 8,238,412) filed Aug. 12, 2016 (46 pages).
Petition for Inter Partes Review of U.S. Pat. No. 8,238,412, including Exhibits 1001-1023, Case No. IPR2016-01009, filed May 6, 2016 (4293 pages).
Notice of Filing Date Accorded to Petition and Time for Filing Patent Owner Preliminary Response for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed May 12, 2016 (5 pages).
Notice of Accepting Corrected Petition for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed May 16, 2016 (2 pages).
Patent Owner's Mandatory Notices Pursuant to 37 C.F.R. § 42.8(a)(2) for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed May 29, 2016 (9 pages).
Patent Owner's Preliminary Response for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Aug. 12, 2016 (65 pages).
Official Action for U.S. Appl. No. 15/016,432, dated Jul. 12, 2017.
Documents filed with District Court Proceedings for *TQ Delta, LLC* v. *2Wire, Inc.*; U.S. District Court, for the District of Delaware (Wilmington); Civil Action No. 1:13-cv-01835-RGA; Includes documents filed on Feb. 10, 2017, made available on May 11, 2017; Docket Nos. 269; (52 pages).
Documents filed with District Court Proceedings for *TQ Delta, LLC* v. *2Wire, Inc.*; U.S. District Court, for the District of Delaware (Wilmington); Civil Action No. 1:13-cv-01835-RGA; Includes documents filed from May 2, 2017 to Jul. 14, 2017; Docket Nos. 287-335; (1183 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed on Feb. 10, 2017, made available on May 11, 2017; Docket Nos. 239; (52 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed May 2, 2017 to Jul. 14, 2017; Docket Nos. 254-299; (1080 pages).
Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents filed on Feb. 10, 2017, made available on May 11, 2017; Docket Nos. 259; (52 pages).
Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents filed from May 2, 2017-Jul. 14, 2017; Docket Nos. 274-320; (1080 pages).
Documents filed with District Court Proceedings for *TQ Delta, LLC* v. *Adtran Inc.*; U.S. District Court, for the District of Delaware (Wilmington); Civil Action No. 1:14-cv-00954-RGA;Includes documents filed on Feb. 10, 2017, made available on May 11, 2017; Docket Nos. 102; (52 pages).
Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents filed from May 2, 2017-Jul. 14, 2017; Docket Nos. 119-167; (1087 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed on Feb. 10, 2017, made available on May 11, 2017; Docket Nos. 107; (52 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from May 2, 2017-Jul. 14, 2017; Docket Nos. 122-169 (1083 pages).
Petitioner's Reply *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jun. 8, 2017 (285 pages).
Patent Owner's Motion for Pro Hac Vice Admission Under 37 C.F.R. § 41.10(c) for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jun. 13, 2017 (11 pages).
Patent Owner's Objection to Evidence Pursuant to 37 C.F.R. § 42.64(b)(1) for *Cisco Systems, Inc.* v. *TQ Delta, LLC*, United States

(56) References Cited

OTHER PUBLICATIONS

Patent and Trademark Office—Before the Patent Trial and Appeal Board, Case No. IPR 2016-01006 (U.S. Pat. No. 7,835,430) filed Jun. 15, 2017 (7 pages).
Second Notice of Deposition of Dr. Sayfe Kiaei for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jun. 16, 2017 (4 pages).
Order—Conduct of the Proceeding for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jun. 22, 2017 (5 pages).
Patent Owner's Listing of Improper Reply / New Argument and Evidence for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jun. 27, 2017 (13 pages).
Notice of Stipulation for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jun. 28, 2017 (4 pages).
Petitioner's Updated Exhibit List for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jun. 28, 2017 (5 pages).
Petitioner's Request for oral Hearing for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jun. 30, 2017 (4 pages).
Petitioner's Itemized Listing Pursuant of Paper 21 for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 3, 2017 (3 pages).
Order—Motion for Pro Hac Vice Admission for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 5. 2017 (4 pages).
Patent Owner's Motion for Observation for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 5, 2017 (79 pages).
Patent Owner's Motion to Exclude Inadmissible Evidence Pursuant to 37 C.F.R. § 42.64(c) for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 5, 2017 (7 pages).
Patent Owner's Objection to Supplemental Evidence for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 5, 2017 (4 pages).
Patent Owner's Request for Oral Argument for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 5, 2017 (5 pages).
Patent Owner's Updated Mandatory Notice for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 10, 2017 (4 pages).
Petitioner's Response to Patent Owner's Motion for Observation on Cross-Examination Testimony for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 17, 2017 (9 pages).
Petitioner's Opposition to Patent Owner's Motion to Exclude for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 17, 2017 (9 pages).
Order—Trial Hearing Order for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 20, 2017 (8 pages).
Patent Owner's Reply in Support of its Motion to Exclude Inadmissible Evidence for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Jul. 21, 2017 (8 pages).
Petitioner's Reply for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jun. 8, 2017 (294 pages).
Patent Owner's Motion for Pro Hac Vice Admission Under 37 C.F.R. § 41.10(c) for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jun. 13, 2017 (11 pages).
Patent Owner's Objections to Evidence Pursuant to 37 C.F.R. § 42.64(b)(1) for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jun. 15, 2017 (6 pages).
Second Notice of Deposition of Dr. Sayfe Kiaei for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jun. 16, 2017 (4 pages).
Order—Conduct of the Proceeding for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jun. 22, 2017 (4 pages).
Patent Owner's Listing of Improper Reply / New Argument and Evidence for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jun. 27, 2017 (13 pages).
Notice of Stipulation for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jun. 28, 2017 (4 pages).
Petitioner's Updated Exhibit List for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jun. 28, 2017 (5 pages).
Petitioner's Request for Oral Hearing for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jun. 30, 2017 (4 pages).
Petitioner's Itemized Listing Pursuant to Paper 20 for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jul. 3, 2017 (4 pages).
Order—Motion for Pro Hac Vice Admission for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jul. 5, 2017 (4 pages).
Patent Owner's Motion for Observation for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jul. 5, 2017 (90 pages).
Patent Owner's Motion to Exclude Inadmissible Evidence Pursuant to 37 C.F.R § 42.64(c) for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jul. 5, 2017 (6 pages).
Patent Owner's Objections to Supplemental Evidence Pursuant to 37 C.F.R. 42.64(b)(1) for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jul. 5, 2017 (3 pages).
Patent Owner's Request for Oral Argument for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Jul. 5, 2017 (5 pages).

(56) References Cited

OTHER PUBLICATIONS

Patent Owner's Updated Mandatory Notice (Re: Additional Backup Counsel) for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Jul. 10, 2017 (4 pages).
Petitioner's Opposition to Patent Owner's Motion to Exclude for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Jul. 17, 2017 (9 pages).
Petitioner's Response to Patent Owner's Motion for Observation on Cross-Examination Testimony for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Jul. 17, 2017 (12 pages).
Order—Trial Hearing Order for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Jul. 20, 2017 (7 pages).
Patent Owner's Reply in Support of its Motion to Exclude Inadmissible Evidence for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Jul. 21, 2017 (8 pages).
Petitioner's Reply for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jun. 8, 2017 (294 pages).
Patent Owner's Motion for Pro Hac Vice Admission Under 37 C.F.R. 41.10(c) for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jun. 13, 2017 (11 pages).
Patent Owner's Objections to Evidence Pursuant to 37 C.F.R. 42.64(b)(1) for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jun. 15, 2017 (7 pages).
Second Notice of Deposition of Dr. Sayfe Kiaei for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jun. 16, 2017 (4 pages).
Order—Conduct of the Proceeding for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jun. 22, 2017 (5 pages).
Patent Owner's Listing of Improper Reply / New Argument and Evidence for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jun. 27, 2017 (13 pages).
Notice of Stipulation for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jun. 28, 2017 (4 pages).
Petitioner's Updated Exhibit List for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jun. 28, 2017 (5 pages).
Petitioner's Request for Oral Hearing for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jun. 30, 2017 (4 pages).
Petitioner's Itemized Listing Pursuant to Paper 21 for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 3, 2017 (4 pages).
Patent Owner's Motion for Observation for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 5, 2017 (91 pages).
Corrected Patent Owner's Motion for Observation for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 5, 2017 (14 pages).
Patent Owner's Motion to Exclude Inadmissible Evidence Pursuant to 37 C.F.R. 42.64(c) for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 15, 2017 (7 pages).
Patent Owner's Objections to Supplemental Evidence Pursuant to 37 C.F.R 42.64(b)(1) for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 5, 2017 (4 pages).
Patent Owner's Request for Oral Argument for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 5, 2017 (5 pages).
Order—Motion for Pro Hac Vice Admission for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 5, 2017 (4 pages).
Patent Owner's Updated Mandatory Notice (Re: Additional Backup Counsel) for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 10, 2017 (4 pages).
Petitioner's Opposition to Patent Owner's Motion to Exclude for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 17, 2017 (9 pages).
Petitioner's Response to Patent Owner's Motion for Observation on Cross-Examination Testimony for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 17, 2017 (12 pages).
Order—Trial Hearing for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 20, 2017 (8 pages).
Patent Owner's Reply in Support of its Motion to Exclude Inadmissible Evidence for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jul. 21, 2017 (8 pages).
Petitioner's Reply for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Jun. 8, 2017 (295 pages).
Patent Owner's Motion for Pro Hac Vice Admission Under 37 C.F.R. 41,10(c) for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Jun. 13, 2017 (10 pages).
Patent Owner's Objections to Evidence Pursuant to 37 C.F.R. 42.64(b)(1) for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Jun. 15, 2017 (6 pages).
Second Notice of Deposition of Dr. Sayfe Kiaei for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Jun. 16, 2017 (3 pages).
Order—Conduct of the Proceeding for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Jun. 22, 2017 (4 pages).
Patent Owner's Listing of Improper Reply / New Argument and Evidence for *Cisco Systems, Inc. v. TQ Delta, LLC*, United States

(56) References Cited

OTHER PUBLICATIONS

Patent and Trademark Office—Before the Patent Trial and Appeal Board, Case No. IPR 2016-01009 (U.S. Pat. No. 8,238,412) filed Jun. 27, 2017 (13 pages).
Notice of Stipulation for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jun. 28, 2017 (3 pages).
Petitioner's Updated Exhibit List for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jun. 28, 2017 (5 pages).
Petitioner's Request for Oral Hearing for *Cisco Systems, Inc.* v. *TQ Delta, LLC*, United States Patent and Trademark Office—Before the Patent Trial and Appeal Board, Case No. IPR 2016- 01009 (U.S. Pat. No. 8,238,412) filed Jun. 30, 2017 (4 pages).
Petitioner's Itemized Listing Pursuant to Paper 19 for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 3, 2017 (4 pages).
Order—Motion for Pro Hac Vice for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 5, 2017 (4 pages).
Patent Owner's Motion for Observation for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 5, 2017 (94 pages).
Patent Owner's Motion to Exclude Inadmissible Evidence Pursuant to 37 C.F.R 42.64(c) for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 5, 2017 (6 pages).
Patent Owner's Objections to Supplemental Evidence for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 5, 2017 (3 pages).
Patent Owner's Request for Oral Argument for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 5, 2017 (4 pages).
Patent Owner's Updated Mandatory Notice (Re: Additional Backup Counsel) for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 10, 2017 (3 pages).
Petitioner's Opposition to Patent Owner's Motion to Exclude for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 17, 2017 (9 pages).
Petitioner's Response to Patent Owner's Motion for Observation on Cross-Examination Testimony for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 17, 2017 (17 pages).
Order—Trial Hearing for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 20, 2017 (7 pages).
Patent Owner's Reply in Support of its Motion to Exclude Inadmissible Evidence for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Jul. 21, 2017 (7 pages).
Second Examination Report for Australian Patent Application No. 2015200087 dated Feb. 8, 2017.
Documents filed with District Court Proceedings for *TQ Delta, LLC* v. *2Wire, Inc.*; U.S. District Court, for the District of Delaware (Wilmington); Civil Action No. 1:13-cv-01835-RGA; Includes documents filed from Oct. 26, 2016-Nov. 17, 2016; Docket Nos. 240-245; (37 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed Oct. 26, 2016-Nov. 17, 2016; Docket Nos. 223-227; (35 pages).
Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents filed from Oct. 26, 2016-Nov. 17, 2016; Docket Nos. 242-246; (35 pages).
Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents filed from Nov. 4, 2016-Nov. 17, 2016; Docket Nos. 87-90; (11 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Nov. 4, 2016-Nov. 17, 2016; Docket Nos. 92-95; (11 pages).
Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Oct. 13, 2016-Nov. 22, 2016; Docket Nos. 154-208 (1083 pages).
Documents filed with District Court Proceedings for *TQ Delta, LLC* v. *Coxcom LLC et al.*; U.S. District Court, for the District of Delaware (Wilmington); Civil Action No. 1:15-cv-00612-RGA; Includes documents filed from Oct. 13, 2016-Nov. 22, 2016; Docket Nos. 152-206 (1084 pages).
Documents filed with District Court Proceedings for *TQ Delta, LLC* v. *Directv LLC*; U.S. District Court, for the District of Delaware (Wilmington); Civil Action No. 1:15-cv-00613-RGA; Includes documents filed from Oct. 13, 2016-Nov. 22, 2016; Docket Nos. 153-193; (940 pages).
Documents filed with District Court Proceedings for *TQ Delta, LLC* v. *Dish Network Corporation et al.*; U.S. District Court, for the District of Delaware (Wilmington); Civil Action No. 1:15-cv-00614-RGA; Includes documents filed from Oct. 13, 2016-Nov. 21, 2016; Docket Nos. 144-194; (1099 pages).
Documents filed with District Court Proceedings for *TQ Delta, LLC* v. *Time Warner Cable Inc., et al.*; U.S. District Court, for the District of Delaware (Wilmington); Civil Action No. 1:15-cv-00615-RGA; Includes documents filed from Oct. 13, 2016-Nov. 22, 2016; Docket Nos. 152-200; (1031 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed from Oct. 13, 2016-Nov. 22, 2016; Docket Nos. 157-209; (1036 pages).
Petitioner's Request for Refund of Post-Institution Fees for *Arris Group, Inc.* v. *TQ Delta, LLC*, United States Patent and Trademark Office—Before the Patent Trial and Appeal Board, Case No. IPR 2016-00428 filed Nov. 4, 2016 (3 pages).
Notice of Refund for *Arris Group, Inc.* v. *TQ Delta, LLC*, United States Patent and Trademark Office—Before the Patent Trial and Appeal Board, Case No. IPR 2016-00428 filed Nov. 16, 2016 (2 pages).
Petitioner's Request for Refund of Post-Institution Fees for *Arris Group, Inc.* v. *TQ Delta, LLC*, United States Patent and Trademark Office—Before the Patent Trial and Appeal Board, Case No. IPR 2016-00430 filed Nov. 4, 2016 (3 pages).
Notice of Refund for *Arris Group, Inc.* v. *TQ Delta, LLC*, United States Patent and Trademark Office—Before the Patent Trial and Appeal Board, Case No. IPR 2016-00430 filed Nov. 16, 2016 (2 pages).
Petitioner's Request for Refund of Post-Institution Fees for *Arris Group, Inc.* v. *TQ Delta, LLC*, United States Patent and Trademark Office—Before the Patent Trial and Appeal Board, Case No. IPR 2016-00429 filed Nov. 4, 2016 (3 pages).

(56) References Cited

OTHER PUBLICATIONS

Notice of Refund for *Arris Group, Inc. v. TQ Delta, LLC*, United States Patent and Trademark Office—Before the Patent Trial and Appeal Board, Case No. IPR 2016-00429 filed Nov. 16, 2016 (2 pages).
Decision: Institution of Inter Partes Review 37 C.F.R. § 42.108 for *Cisco Systems, Inc. v. TQ Delta, LLC*, United States Patent and Trademark Office—Before the Patent Trial and Appeal Board, Case No. IPR 2016-01006 (U.S. Pat. No. 7,835,430) filed Nov. 4, 2016 (23 pages).
Scheduling Order for *Cisco Systems, Inc. v. TQ Delta, LLC*, United States Patent and Trademark Office—Before the Patent Trial and Appeal Board, Case No. IPR 2016-01006 (U.S. Pat. No. 7,835,430) filed Nov. 4, 2016 (9 pages).
Decision: Institution of Inter Partes Review 37 C.F.R. §42.108 for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Nov. 4, 2016 (24 pages).
Scheduling Order for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Nov. 4, 2016 (9 pages).
Decision: Institution of Inter Partes Review 37 C.F.R. § 42.108 for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Nov. 4, 2016 (25 pages).
Scheduling Order for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Nov. 4, 2016 (9 pages).
Decision: Institution of Inter Partes Review 37 C.F.R. § 42.108 for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Nov. 4, 2016 (31 pages).
Scheduling Order for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Nov. 4, 2016 (9 pages).
Petition for Inter Partes Review of U.S. Pat. No. 7,835,430, including Exhibits 1001-1023, Case No. IPR2017-00251, filed Nov. 11, 2016 (4202 pages).
Motion for Joinder for *Dish Network, LLC v. TQ Delta LLC*, United States Patent and Trademark Office—Before the Patent Trial and Appeal Board, Case No. IPR 2017-00251 (U.S. Pat. No. 7,835,430) filed Nov. 11, 2016 (6 pages).
Notice of Filing Date Accorded to Petition and Time for Filing Patent Owner Preliminary Response for *Dish Network, LLC v. TQ Delta LLC*, United States Patent and Trademark Office—Before the Patent Trial and Appeal Board, Case No. IPR 2017-00251 (U.S. Pat. No. 7,835,430) filed Dec. 2, 2016 (5 pages).
Patent Owner's Mandatory Notices Pursuant to 37 C,F.R. § 42.8(a)(2) for *Dish Network, LLC v. TQ Delta LLC*, United States Patent and Trademark Office—Before the Patent Trial and Appeal Board, Case No. IPR 2017-00251 (U.S. Pat. No. 7,835,430) filed Dec. 2, 2016 (9 pages).
Petition for Inter Partes Review of U.S. Pat. No. 8,238,412 including Exhibits 1001-1023, Case No. IPR2017-00253, filed Nov. 11, 2016 (4272 pages).
Motion for Joinder for *Dish Network, LLC v. TQ Delta LLC*, United States Patent and Trademark Office—Before the Patent Trial and Appeal Board, Case No. IPR 2017-00253 (U.S. Pat. No. 8,238,412) filed Nov. 11, 2016 (6 pages).
Notice of Filing Date Accorded to Petition and Time for Filing Patent Owner Preliminary Response for *Dish Network, LLC v. TQ Delta LLC*, United States Patent and Trademark Office—Before the Patent Trial and Appeal Board, Case No. IPR 2017-00253 (U.S. Pat. No. 8,238,412) filed Dec. 2, 2016 (5 pages).
Patent Owner's Mandatory Notices Pursuant to 37 C.F.R. § 42.8(a)(2) for *Dish Network, LLC v. TQ Delta LLC*, United States Patent and Trademark Office—Before the Patent Trial and Appeal Board, Case No. IPR 2017-00253 (U.S. Pat. No. 8,238,412) filed Dec. 2, 2016 (9 pages).
Ballard, Michael "Applied Digital Signal Processing: The Telebit Trailblazer Modem," Packet Status Register, Issue #31, p. 4 1988 (12 pages).
Byrd, M. "9,600-BPS Modems: Breaking the Speed Barrier," PC Magazine, Dec. 11, 1990 (28 pages).
Casas, E.F. et al. "OFDM for Data Communication Over Mobile Radio FM Channels—Part 1: Analysis and Experimental Results," IEEE Transactions on Communications, vol. 39, No. 5, May 1991 (11 pages).
Chow, Jacky S. "A Discrete Multitone Transceiver System for HDSL Applications" IEEE Journal on Selected Areas in Communications; vol. 9, No. 6, Aug. 1991 (14 pages).
Cioffi, John M. "History of Communications: Lighting Up Copper" IEEE Communications Magazine; May 2011; 11 pages.
Computerworld "Telebit Introduces Asynchronous Error Correcting Modem" Jul. 22, 1985 (4 pages).
Gilder, George "Inventing the Internet Again" Discovery Institute; Forbes ASAP; Jun. 1, 1997 (16 pages).
Held, Gilbert "Data Communications Networking Devices: Operation, Utilization and LAN and WAN Internetworking" 4th Edition; John Wiley & Sons; 1999 (872 pages).
Mace, Scott "Telebit Multicarrier Modem Supports 19.2kbps Data Rate" Info World; Feb. 27, 1989 (2 pages).
Newton, Harry "Newton's Telecom Dictionary: The Official Dictionary of Telecommunications Networking and the Internet" 16th ed., 2000 (12 pages).
"Packetized Ensemble Modem: Firmware Release 3 Commands and Registers Reference Manual" Oct. 1987 (4 pages).
Proceedings: IEEE INFOCOM '86 Fifth Annual Conference: "Computers and Communications Integration Design, Analysis, Management" Apr. 8-10, 1986 (23 pages).
Schefter, Jim "Fast-Lane Modems" Popular Science; Nov. 1, 1985 (1 page).
Technical Report—TR-004 "Network Migration" Dec. 1997 (58 pages).
Telebit T2500 Reference Manual (90100-02 Rev.C) 1990 (258 pages).
Telebit T1000 Reference Manual—900062-02 Rev. E; 1988 (211 pages).
Telebit "TrailBlazer: High-Speed Standalone Modem for Dial-Up Communications" Aug. 15, 1986 (2 pages).
Walkoe Wil et al. "High Bit Rate Digital Subscriber Line: A Copper Bridge to the Network of the Future" IEEE Journal on Selected Areas in Communications, vol. 9, No. 6, 1991 (4 pages).
Werner, Jean-Jacques "The HDSL Environment" IEEE Journal on Selected Areas in Communications, vol. 9, No. 6, Aug. 1991 (16 pages).
Notice of Acceptance of Application for Australian Patent Application No. 2017201226 dated May 10, 2017.
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed made available on Dec. 19, 2016; Docket No. 237; (36 pages).
Documents filed with District Court Proceedings for *TQ Delta, LLC v. 2Wire, Inc.*; U.S. District Court, for the District of Delaware (Wilmington); Civil Action No, 1:13-cv-01835-RGA; Includes documents filed from Feb. 6, 2017 to May 1, 2017; Docket Nos. 266-286; (124 pages).
Defendant 2Wire, Inc.'s Invalidity Contentions in Response to TQ Delta's Dec. 8, 2016 Final Infringement Contentions for *TQ Delta, LLC v. 2Wire, Inc.*—Including Claim Charts for Family 1 as Exhibits A-1 to A-21; B-1 to B-21; C-1 to C-21; and D-1 to D-21; in the United States ; District Court for the District of Delaware; Civil Action No. 13-01835-RGA; filed Jan. 23, 2017 (1435 pages).
Documents filed with District Court Proceedings for *TQ Delta, LLC v. Zhone Technologies Inc.*; U.S. District Court, for the District of

(56) References Cited

OTHER PUBLICATIONS

Delaware (Wilmington); Civil Action No. 1:13-cv-01836-RGA; Includes documents filed Feb. 8, 2017 to Apr. 26, 2017; Docket Nos. 237-253; (118 pages).
Defendant Zhone Technologies, Inc.'s Final Invalidity Contentions in Response to Plaintiff's Final Infringement Charts Regarding Non-Broadcorn Products for *TQ Delta, LLC* v. *Zhone Technologies, Inc.*—Including Claim Charts for Family 1 as Exhibits 1-57; in the United States District Court for the District of Delaware; Civil Action No. 13-01836-RGA; filed Jan. 23, 2017 (650 pages).
Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents filed from Feb. 8, 2017-May 1, 2017; Docket Nos. 257-273; (69 pages).
Defendant Zyxel's Technologies, Inc.'s Final Invalidity Contentions in Response to Plaintiff's Dec. 8, 2016 Final Infringement Charts Regarding Non-Broadcom Products for *TQ Delta, LLC* v. *Zyxel Communications, Inc. and Zyxel Communications Corporation*—Including Claim Charts for Family 1 as Exhibits A1-A57; in the United States District Court for the District of Delaware; Civil Action No. 13-02013-RGA; filed Jan. 23, 2017 (622 pages).
Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents filed from Feb. 8, 2017-May 1, 2017; Docket Nos. 100-118; (128 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Feb. 8, 2017-May 1, 2017; Docket Nos. 105-122 (118 pages).
Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents made available on Feb. 13, 2017; Docket No. 190 (73 pages).
Documents filed with District Court Proceedings for *TQ Delta, LLC* v. *Coxcom LLC et al.*; U.S. District Court, for the District of Delaware (Wilmington); Civil Action No. 1:15-cv-00612-RGA; Includes documents made available on Feb. 13, 2017; Docket No. 187 (73 pages).
Documents filed with District Court Proceedings for *TQ Delta, LLC* v. *Directv LLC*; U.S. District Court, for the District of Delaware (Wilmington); Civil Action No. 1:15-cv-00613-RGA; Includes documents made available on Feb. 13, 2017; Docket No. 185; (73 pages).
Documents filed with District Court Proceedings for *TQ Delta, LLC* v. *Time Warner Cable Inc., et al.*; U.S. District Court, for the District of Delaware (Wilmington); Civil Action No. 1:15-cv-00615-RGA; includes documents made available on Feb. 13, 2017; Docket No. 186; (73 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents made available on Feb. 13, 2017; Docket No. 191; (73 pages).
Decision Instituting Inter Partes Review and Granting Motion for Joinder in corresponding case IPR 2017-00251 filed in *Cisco Systems, Inc.* v. *TQ Delta, LLC* United States Patent and Trademark Office—Before the Patent Trial and Appeal Board, Case No. IPR 2016-01006 (U.S. Pat. No. 7,835,430) filed Feb. 14, 2017 (8 pages).
Petitioner's Updated Mandatory Notice for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Feb. 20, 2017 (3 pages).
Patent Owner's Response Under 37 § 42.120 for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Feb. 24, 2017 (223 pages).
Decision Instituting Inter Partes Review and Granting Motion for Joinder in corresponding case IPR 2017-00420 filed in *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Apr. 3, 2017 (9 pages).
Petitioner's Notice of Taking Deposition of Dr. Douglas Chrissan for *Cisco Systems, Inc.* v. *TQ Delta, LLC*, United States Patent and Trademark Office—Before the Patent Trial and Appeal Board, Case No. IPR 2016-01006 (U.S. Pat. No. 7,835,430) filed Apr. 19, 2017 (3 pages).
Patent Owner's Response Under 37 CFR § 42.120 for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Feb. 24, 2017 (228 pages).
Decision Instituting Inter Partes Review and Granting Motion for Joinder in corresponding case IPR 2017-00422 filed in *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Apr. 4, 2017 (9 pages).
Petitioner's Notice of Taking Deposition of Dr. Douglas Chrissan for *Cisco Systems, Inc.* v. *TQ Delta, LLC*, United States Patent and Trademark Office—Before the Patent Trial and Appeal Board, Case No. IPR 2016-01007 (U.S. Pat. No. 8,432,956) filed Apr. 19, 2017 (3 pages).
Patent Owner's Response Under 37 CFR § 42.120 for *Cisco Systems, Inc.* v. *TQ Delta, LLC*, United States Patent and Trademark Office—Before the Patent Trial and Appeal Board, Case No. IPR 2016-01008 (U.S. Pat. No. 8,238,412) filed Feb. 24, 2017 (228 pages).
Decision Instituting Inter Partes Review and Granting Motion for Joinder in corresponding case IPR 2017-00253 filed in *Cisco Systems, Inc.* v. *TQ Delta, LLC*, United States Patent and Trademark Office—Before the Patent Trial and Appeal Board, Case No. IPR 2016-01008 (U.S. Pat. No. 8,238,412) filed Feb. 27, 2017 (9 pages).
Decision Instituting Inter Partes Review and Granting Motion for Joinder in corresponding case IPR 2017-00419 filed in *Cisco Systems, Inc.* v. *TQ Delta, LLC*, United States Patent and Trademark Office—Before the Patent Trial and Appeal Board, Case No. IPR 2016-01008 (U.S. Pat. No. 8,238,412) filed Apr. 3, 2017 (9 pages).
Petitioner's Notice of Taking Deposition of Dr. Douglas Chrissan for *Cisco Systems, Inc.* v. *TQ Delta, LLC*, United States Patent and Trademark Office—Before the Patent Trial and Appeal Board, Case No. IPR 2016-01008 (U.S. Pat. No. 8,238,412) filed Apr. 19, 2017 (3 pages).
Patent Owner's Response Under 37 CFR § 42.120 for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Feb. 24, 2017 (246 pages).
Petitioner's Notice of Taking Deposition of Dr. Douglas Chrissan for *Cisco Systems, Inc.* v. *TQ Delta, LLC*, United States Patent and Trademark Office—Before the Patent Trial and Appeal Board, Case No. IPR 2016-01009 (U.S. Pat. No. 8,238,412) filed Apr. 19, 2017 (3 pages).
Order—Granting Motion for Pro Hac Vice Admission for *Dish Network, LLC* v. *TQ Delta LLC*, United States Patent and Trademark Office—Before the Patent Trial and Appeal Board, Case No. IPR 2017-00251 (U.S. Pat. No. 7,835,430) filed Feb. 7, 2017 (4 pages).
Order Granting Motion for Pro Hac Vice Admission for *Dish Network, LLC* v. *TQ Delta LLC*, United States Patent and Trademark Office—Before the Patent Trial and Appeal Board, Case No. IPR 2017-00253 (U.S. Pat. No. 8,238,412) filed Feb. 7, 2017 (4 pages).
Petitioner's Updated Mandatory Notice for *Dish Network, LLC* v. *TQ Delta LLC*, United States Patent and Trademark Office—Before the Patent Trial and Appeal Board, Case No. IPR 2017-00253 (U.S. Pat. No. 8,238,412) filed Feb. 9, 2017 (3 pages).
Decision—Institution of Inter Partes Review and Petitioner's Motion for Joinder for *Dish Network, LLC* v. *TQ Delta LLC*, United

(56) References Cited

OTHER PUBLICATIONS

States Patent and Trademark Office—Before the Patent Trial and Appeal Board, Case No. IPR 2017-00253 (U.S. Pat. No. 8,238,412) filed Feb. 27, 2017 (9 pages).
Decision—Institution of Inter Partes Review and Petitioner's Motion for Joinder for *Comcast Cable Communications, LLC et al. v. TQ Delta LLC*, United States Patent and Trademark Office—Before the Patent Trial and Appeal Board, Case No. IPR 2017-00419 (U.S. Pat. No. 8,238,412) filed Apr. 3, 2017 (9 pages).
Decision—Institution of Inter Partes Review and Petitioner's Motion for Joinder for *Comcast Cable Communications, LLC et al. v. TQ Delta LLC*, United States Patent and Trademark Office—Before the Patent Trial and Appeal Board, Case No. IPR 2017-00420 (U.S. Pat. No. 7,835,430) filed Apr. 3, 2017 (9 pages).
Decision—Institution of Inter Partes Review and Petitioner's Motion for Joinder for *Arris Group, Inc. v. TQ Delta LLC*, United States Patent and Trademark Office—Before the Patent Trial and Appeal Board, Case No. IPR 2017-00422 (U.S. Pat. No. 8,432,956) filed Apr. 4, 2017 (9 pages).
Official Action for U.S. Appl. No. 15/016,432, dated Dec. 22, 2016.
Official Action for U.S. Appl. No. 15/098,932, dated Feb. 7, 2017.
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed on Sep. 18, 2016 and made available on Dec. 19, 2016 Docket No. 237; (36 pages).
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed from Dec. 9, 2016-Feb. 3, 2017; Docket Nos. 246-265; (688 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; includes documents filed Dec. 9, 2016-Feb. 3, 2017; Docket Nos. 228-236; (21 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 9, 2016-Feb. 3, 2017; Docket Nos. 247-256; (23 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Dec. 9, 2016-Feb. 3, 2017; Docket Nos. 91-99; (19 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Dec. 9, 2016-Feb. 3, 2017; Docket Nos. 96-104 (19 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed Sep. 21, 2016, made publicly available on Dec. 20, 2016; Docket No. 139 (39 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed Oct. 13, 2016, made publicly available on Jan. 11, 2017; Docket No. 154 (55 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed Oct. 19, 2016, made publicly available on Jan. 17, 2017; Docket No. 158 (164 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Nov. 22, 2016-Dec. 21, 2016; Docket Nos. 209-234 (929 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed on Sep. 21, 2016, made publicly available on Dec. 20, 2016; Docket No. 136 (39 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed on Oct. 13, 2016, made publicly available on Jan. 11, 2017; Docket No. 151 (55 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed on Oct. 19, 2016, made publicly available on Jan. 17, 2017; Docket No. 155 (164 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Nov. 22, 2016-Dec. 21, 2016; Docket Nos. 207-232 (981 pages).
Documents filed with District Court Proceedings for *TQ Delta, LLC v. Directv LLC*; U.S. District Court, for the District of Delaware (Wilmington); Civil Action No. 1:15-cv-00613-RGA; Includes documents filed on Oct. 13, 2016—made publicly available Jan. 11, 2017; Docket No. 152; (55 pages).
Documents filed with District Court Proceedings for *TQ Delta, LLC v. Directv LLC*; U.S. District Court, for the District of Delaware (Wilmington); Civil Action No. 1:15-cv-00613-RGA; Includes documents filed on Oct. 19, 2016—made publicly available Jan. 17, 2017; Docket No. 156; (164 pages).
Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Nov. 22, 2016-Dec. 21, 2016; Docket Nos. 194-223; (997 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed on Oct. 13, 2016, made publicly available on Jan. 11, 2017; Docket No. 143; (55 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed on Oct. 19, 2016, made publicly available on Jan. 17, 2017; Docket No. 147; (164 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Nov. 22, 2016-Dec. 21, 2016; Docket Nos. 195-218; (950 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed Sep. 21, 2016 and made publicly available on Dec. 20, 2016; Docket No. 135; (39 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed Oct. 13, 2016 and made publicly available on Jan. 11, 2017; Docket No. 150; (55 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed Oct. 19, 2016 and made publicly available on Jan 17, 2017; Docket No. 154; (164 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Nov. 22, 2016-Dec. 21, 2016; Docket Nos. 201-221; (873 pages).

(56) References Cited

OTHER PUBLICATIONS

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed on Sep. 21, 2016 and made publicly available on Dec. 20, 2016; Docket No. 140; (39 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed on Oct. 13, 2016 and made publicly available on Jan. 11, 2017; Docket No. 155; (55 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed on Oct. 19, 2016 and made publicly available on Jan. 17, 2017; Docket No. 159; (164 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Nov. 22, 2016-Dec. 21, 2016; Docket Nos. 210-234; (980 pages).
Joint Stipulation to Move Due Dates 1 and 2 for *Cisco Systems, Inc. v. TQ Delta, LLC*, United States Patent and Trademark Office—Before the Patent Trial and Appeal Board, Case No. IPR 2016-01006 (U.S. Pat. No. 7,835,430) filed Jan. 9. 2017 (3 pages).
Petitioner Cisco Systems, Inc.'s Updated Mandatory Notices for *Cisco Systems, Inc. v. TQ Delta, LLC*, United States Patent and Trademark Office—Before the Patent Trial and Appeal Board, Case No. IPR 2016-01006 (U.S. Pat. No. 7,835,430) filed Jan. 25, 2017 (4 pages).
Notice of Deposition of Dr. Sayfe Kiaei for *Cisco Systems, Inc. v. TQ Delta, LLC*, United States Patent and Trademark Office—Before the Patent Trial and Appeal Board, Case No. IPR 2016-01006 (U.S. Pat. No. 7,835,430) filed Jan. 25, 2017 (4 pages).
Joint Stipulation to Move Due Dates 1 and 2 for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Jan. 9, 2017 (3 pages).
Petitioner Cisco Systems, Inc.'s Updated Mandatory Notices for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Jan. 25, 2017 (4 pages).
Notice of Deposition of Dr. Sayfe Kiaei for *Cisco Systems, Inc. v. TQ Delta, LLC*, United States Patent and Trademark Office—Before the Patent Trial and Appeal Board, Case No. IPR 2016-01007 (U.S. Pat. No. 8,432,956) filed Jan. 25, 2017 (3 pages).
Joint Stipulation to Move Due Dates 1 and 2 for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jan. 9, 2017 (3 pages).
Petitioner Cisco Systems, Inc.'s Updated Mandatory Notices for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jan. 25, 2017 (4 pages).
Notice of Deposition of Dr. Sayfe Kiaei for *Cisco Systems, Inc. v. TQ Delta, LLC*, United States Patent and Trademark Office—Before the Patent Trial and Appeal Board, Case No. IPR 2016-01008 (U.S. Pat. No. 8,238,412) filed Jan. 25, 2017 (3 pages).
Joint Stipulation to Move Due Dates 1 and 2 for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Jan. 9, 2017 (3 pages).
Petitioner Cisco Systems, Inc.'s Updated Mandatory Notices for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Jan. 25, 2017 (4 pages).

Notice of Deposition of Dr. Sayfe Kiaei for *Cisco Systems, Inc. v. TQ Delta, LLC*, United States Patent and Trademark Office—Before the Patent Trial and Appeal Board, Case No. IPR 2016-01009 (U.S. Pat. No. 8,238,412) filed Jan. 25, 2017 (3 pages).
Patent Owner's Statement of Non-Opposition to Motion for Joinder and Waiver of Preliminary Response for *Dish Network, LLC v. TQ Delta LLC*, United States Patent and Trademark Office—Before the Patent Trial and Appeal Board, Case No. IPR 2017-00251 (U.S. Pat. No. 7,835,430) filed Dec. 13, 2016 (3 pages).
Petitioner's Motion for Pro Hac Vice Admission Under 37 C.F.R 41.10(c) for *Dish Network, LLC v. TQ Delta LLC*, United States Patent and Trademark Office—Before the Patent Trial and Appeal Board, Case No. IPR 2017-00251 (U.S. Pat. No. 7,835,430) filed Jan. 10, 2017 (12 pages).
Decision—Institution of Inter Partes Review 37 C.F.R 42.108 and Petitioner's Motion for Joinder 37 C.F.R. 42.122(b) for *Dish Network, LLC v. TQ Delta LLC*, United States Patent and Trademark Office—Before the Patent Trial and Appeal Board, Case No. IPR 2017-00251 (U.S. Pat. No. 7,835,430) filed Jan. 19, 2017 (8 pages).
Patent Owner's Statement of Non-Opposition to Motion for Joinder and Waiver of Preliminary Response for *Dish Network, LLC v. TQ Delta LLC*, United States Patent and Trademark Office—Before the Patent Trial and Appeal Board, Case No. IPR 2017-00253 (U.S. Pat. No. 8,238,412) filed Dec. 13, 2016 (3 pages).
Petitioner's Motion for Pro Hac Vice Admission Under 37 C.F.R. 41.10(c) for *Dish Network, LLC v. TQ Delta LLC*, United States Patent and Trademark Office—Before the Patent Trial and Appeal Board, Case No. IPR 2017-00253 (U.S. Pat. No. 8,238,412) filed Jan. 10, 2017 (12 pages).
Petition for Inter Partes Review of U.S. Pat. No. 8,238,412 including Exhibits 1001-1023, Case No. IPR2017-00419, filed Dec. 5, 2016 (4292 pages).
Motion for Joinder for *Comcast Cable Communications, LLC et al. v. TQ Delta LLC*, United States Patent and Trademark Office—Before the Patent Trial and Appeal Board, Case No. IPR 2017-00419 (U.S. Pat. No. 8,238,412) filed Dec. 5, 2016 (10 pages).
Notice of Filing Date Accorded to Petition and Time for Filing Patent Owner Preliminary Response for *Comcast Cable Communications, LLC et al. v. TQ Delta LLC*, United States Patent and Trademark Office—Before the Patent Trial and Appeal Board, Case No. IPR 2017-00419 (U.S. Pat. No. 8,238,412) filed Dec. 21, 2016 (5 pages).
Patent Owner's Mandatory Notices Pursuant to 37 C.F.R. §42.8(a)(2) for *Comcast Cable Communications, LLC v. TQ Delta LLC*, United States Patent and Trademark Office—Before the Parent Trial and Appeal Board, Case No. IPR 2017-00419 (U.S. Pat. No. 8,238,412) filed Dec. 22, 2016 (10 pages).
Patent Owner's Statement of Non-Opposition to Motion for Joinder and Waiver of Preliminary Response for Comcast Cable Communications, LLC et al. v. TQ Delta LLC, United States Patent and Trademark Office—Before the Patent Trial and Appeal Board, Case No. IPR 2017-00419 (U.S. Pat. No. 8,238,412) filed Jan. 27, 2017 (3 pages).
Petition for Inter Partes Review of U.S. Pat. No. 7,835,430 including Exhibits 1001-1023, Case No. IPR2017-00420, filed Dec. 5, 2016 (4206 pages).
Motion for Joinder for *Comcast Cable Communications, LLC et al. v. TQ Delta LLC*, United States Patent and Trademark Office—Before the Patent Trial and Appeal Board, Case No. IPR 2017-00420 (U.S. Pat. No. 7,835,430) filed Dec. 5, 2016 (10 pages).
Patent Owner's Mandatory Notices Pursuant to 37 C.F.R. § 42.8(a)(2) for *Comcast Cable Communications, LLC et al. v. TQ Delta LLC*, United States Patent and Trademark Office Before the Patent Trial and Appeal Board, Case No. IPR 2017-00420 (U.S. Pat. No. 7,835,430) filed Dec. 22, 2016 (10 pages).
Notice of Filing Date Accorded to Petition and Time for Filing Patent Owner Preliminary Response for *Comcast Cable Communications, LLC et al. v. TQ Delta LLC*, United States Patent and Trademark Office—Before the Patent Trial and Appeal Board, Case No. IPR 2017-00420 (U.S. Pat. No. 7,835,430) filed Jan. 4, 2017 (5 pages).
Patent Owner's Statement of Non-Opposition to Motion for Joinder and Waiver of Preliminary Response for *Comcast Cable Commu-*

(56) References Cited

OTHER PUBLICATIONS nications, LLC et al. v. *TQ Delta LLC*, United States Patent and Trademark Office—Before the Patent Trial and Appeal Board, Case No. IPR 2017-00420 (U.S. Pat. No. 7,835,430) filed Jan. 27, 2017 (3 pages).
Petition for Inter Partes Review of U.S. Pat. No. 8,432,956 including Exhibits 1001-1023, Case No. IPR2017-00422, filed Dec. 5, 2016 (4209 pages).
Motion for Joinder for *Arris Group, Inc.* v. *TQ Delta LLC*, United States Patent and Trademark Office—Before the Patent Trial and Appeal Board, Case No. IPR 2017-00422 (U.S. Pat. No. 8,432,956) filed Dec. 5, 2016 (10 pages).
Notice of Filing Date Accorded to Petition and Time for Filing Patent Owner Preliminary Response for *Arris Group, Inc.* v. *TQ Delta LLC*, United States Patent and Trademark Office—Before the Patent Trial and Appeal Board, Case No. IPR 2017-00422 (U.S. Pat. No. 8,432,956) filed Dec. 21, 2016 (5 pages).
Patent Owner's Mandatory Notices Pursuant to 37 C.F.R. § 42.8(a)(2) for *Arris Group, Inc.* v. *TQ Delta LLC*, United States Patent and Trademark Office—Before the Patent Trial and Appeal Board, Case No. IPR 2017-00422 (U.S. Pat. No. 8,432,956) filed Dec. 22, 2016 (10 pages).
Patent Owner's Statement of Non-Opposition to Motion for Joinder and Waiver of Preliminary Response for *Arris Group, Inc.* v. *TQ Delta LLC*, United States Patent and Trademark Office—Before the Patent Trial and Appeal Board, Case No. IPR 2017-00422 (U.S. Pat. No. 8,432,956) filed Jan. 27, 2017 (3 pages).
Official Action for U.S. Appl. No. 15/098,932, dated Sep. 13, 2017.
Documents filed with District Court Proceedings for *TQ Delta, LLC*v. *2WIRE, Inc.*; U.S. District Court, for the District of Delaware (Wilmington); Civil Action No. 1:13-cv-01835-RGA; Includes documents filed from Jul. 28, 2017 to Oct. 26, 2017;(3952 pages).
Documents filed with District Court Proceedings for *TQ Delta, LLC*v. *Zhone Technologies Inc.*; U.S. District Court, for the District of Delaware (Wilmington); Civil Action No. 1:13-cv-01836-RGA; Includes documents filed Jul. 28, 2017-Oct. 25, 2017; (3667 pages).
Documents filed with District Court Proceedings for *TQ Delta, LLC*v. *Zyxel Communications Inc. et al.*; U.S. District Court, for the District of Delaware (Wilmington); Civil Action No. 1:13-cv-02013-RGA; Includes documents filed from Jul. 28, 2017-Oct. 25, 2017; (3667 pages).
Documents filed with District Court Proceedings for *TQ Delta, LLC*v. *Adtran Inc.*; U.S. District Court, for the District of Delaware (Wilmington); Civil Action No. 1:14-cv-00954-RGA; Includes documents filed from Jul. 27, 2017-Oct. 26, 2017; (4034 pages).
Documents filed with District Court Proceedings for *Adtran Inc.*v. *TQ Delta, LLC*; U.S. District Court, for the District of Delaware (Wilmington); Civil Action No. 1:15-cv-00121-RGA; Includes documents filed from Jul. 27, 2017-Oct. 26, 2017; (4146 pages).
Documents filed with District Court Proceedings for *TQ Delta, LLC*v. *Comcast Cable Communications LLC*; U.S. District Court, for the District of Delaware (Wilmington); Civil Action No. 1:15-cv-00611-RGA; Includes documents filed on Oct. 27, 2017; (1 pages).
Documents filed with District Court Proceedings for *TQ Delta, LLC*v. *COXCOM LLC et al.*; U.S. District Court, for the District of Delaware (Wilmington); Civil Action No. 1:15-cv-00612-RGA; Includes documents filed on Oct. 27, 2017; (1 page).
Documents filed with District Court Proceedings for *TQ Delta, LLC*v. *DIRECTV LLC*; U.S. District Court, for the District of Delaware (Wilmington); Civil Action No. 1:15-cv-00613-RGA; Includes documents filed on Oct. 27, 2017; (1 page).
Documents filed with District Court Proceedings for *TQ Delta, LLC*v. *DISH Network Corporation et al.*; U.S. District Court, for the District of Delaware (Wilmington); Civil Action No. 1:15-cv-00614-RGA; Included documents filed on Oct. 27, 2017; (1 page).
Documents filed with District Court Proceedings for *TQ Delta, LLC*v. *Time Warner Cable Inc., et al.*; U.S. District Court, for the District of Delaware (Wilmington); Civil Action No. 1:15-cv-00615-RGA; Includes documents filed on Oct. 27, 2017; (1 page1).

Documents filed with District Court Proceedings for *TQ Delta, LLC*v. *Verizon Services Corp*; U.S. District Court, for the District of Delaware (Wilmington); Civil Action No. 1:15-cv-00616-RGA; Includes documents filed on Oct. 27, 2017; (1 page).
Patent Owner's Objections to Petitioners' Demonstratives for *Cisco Systems, Inc.*v. *TQ Delta, LLC*, United States Patent and Trademark Office-Before the Patent Trial and Appeal Board, Case No.: IPR 2016-01006 (Patent 7,835,430) filed Aug. 1, 2017 (15 pages).
Hearing Transcript fpr *Cisco Systems, Inc.*v. *TQ Delta, LLC*, United States Patent and Trademark Office-Before the Patent Trial and Appeal Board, Case No.: IPR 2016-01006 (Patent 7,835,430) filed Aug. 21, 2017 (83 pages).
Final Written Decision for *Cisco Systems, Inc.*v. *TQ Delta, LLC*, United States Patent and Trademark Office-Before the Patent Trial and Appeal Board, Case No.: IPR 2016-01006 (Patent 7,835,430) filed Oct. 26, 2017 (29 pages).
Patent Owner's Objections to Petitioners Demonstratives for *Cisco Systems, Inc.*v. *TQ Delta, LLC*, United States Patent and Trademark Office-Before the Patent Trial and Appeal Board, Case No.: IPR 2016-01007 (Patent 8,432,956) filed Aug. 1, 2017 (14 pages).
Hearing Transcript for *Cisco Systems, Inc.*v. *TQ Delta, LLC*, United States Patent and Trademark Office-Before the Patent Trial and Appeal Board, Case No.: IPR 2016-01007 (Patent 8,432,956) filed Aug. 21, 2017 (83 pages).
Patent Owner's Objections to Petitioners' Demonstratives for *Cisco Systems, Inc.*v. *TQ Delta, LLC*, United States Patent and Trademark Office-Before the Patent Trial and Appeal Board, Case No.: IPR 2016-01008 (Patent 8,238,412) filed Aug. 1, 2017 (15 pages).
Hearing Transcript for *Cisco Systems, Inc.*v. *TQ Delta, LLC*, United States Patent and Trademark Office-Before the Patent Trial and Appeal Board, Case No.: IPR 2016-01008 (Patent 8,238,412) filed Aug. 21, 2017 (83 pages).
Final Written Decision for *Cisco Systems, Inc.*v. *TQ Delta, LLC*, United States Patent and Trademark Office-Before the Patent Trial and Appeal Board, Case No.: IPR 2016-01008 (Patent 8,238,412) filed Oct. 26, 2017 (42 pages).
Patent Owner's Objections to Petitioners' Demonstratives for *Cisco Systems, Inc.*v. *TQ Delta, LLC*, United States Patent and Trademark Office-Before the Patent Trial and Appeal Board, Case No.: IPR 2016-01009 (Patent 8,238,412) filed Aug. 1, 2017 (14 pages).
Hearing Transcript for *Cisco Systems, Inc.*v. *TQ Delta, LLC*, United States Patent and Trademark Office-Before the Patent Trial and Appeal Board, Case No.: IPR 2016-01009 (Patent 8,238,412) filed Aug. 21, 2017 (83 pages).
Final Written Decision for *Cisco Systems, Inc.*v. *TQ Delta, LLC*, United States Patent and Trademark Office-Before the Patent Trial and Appeal Board, Case No.: IPR 2016-01009 (Patent 8,238,412) filed Oct. 26, 2017 (51 pages).
Final Written Decision for *Dish Network, LLC*v. *TQ Delta LLC*, United States Patent and Trademark Office-Before the Patent Trial and Appeal Board, Case No.: !IPR 2017-00251 (Patent 7,835,430) filed Oct. 26, 2017 (29 pages).
Final Written Decision for *Dish Network, LLC*v. *TQ Delta LLC*, United States Patent and Trademark Office-Before the Patent Trial and Appeal Board, Case No. IPR 2017-00253 (Patent 8,238,412) filed Oct. 26, 2017 (42 pages).
Final Written Decision for *Comcast Cable Communications, LLC et al.*v. *TQ Delta LLC*, United States Patent and Trademark Office-Before the Patent Trial and Appeal Board, Case No.: !IPR 2017-00419 (Patent 8,238,412) filed Oct. 26, 2017 (42 pages).
Final Written Decision for *Comcast Cable Communications, LLC et al.*v. *TQ Delta LLC*, United States Patent and Trademark Office-Before the Patent Trial and Appeal Board, Case No. IPR 2017-00420 (Patent 7,835,430) filed Oct. 26, 2017 (29 pages).
Official Action for Canadian Patent Application No. 2,948,960, dated Oct. 4, 2017.
Office Action for European Patent Application No. 10011985.8 dated Jul. 28, 2017.
Office Action for European Patent Application No. 10011983.3, dated Jul. 28, 2017.
Office Action for European Patent Application No. 10011984.1 dated Aug. 2, 2017.

(56) References Cited

OTHER PUBLICATIONS

Intention to Grant for European Patent Application No. 10011982.5, dated Jul. 27, 2017.

* cited by examiner

SYSTEMS AND METHODS FOR ESTABLISHING A DIAGNOSTIC TRANSMISSION MODE AND COMMUNICATING OVER THE SAME

RELATED APPLICATION DATA

This application is a continuation of U.S. application Ser. No. 14/991,431, filed Jan. 8, 2016, now U.S. Pat. No. 9,479,637, which is a continuation of U.S. application Ser. No. 14/577,769, filed Dec. 19, 2014, which is a continuation of U.S. application Ser. No. 14/153,282, filed Jan. 13, 2014, now U.S. Pat. No. 8,929,423, which is a continuation of U.S. application Ser. No. 13/004,254, filed Jan. 11, 2011, now U.S. Pat. No. 8,634,449, which is a continuation of Ser. No. 12/779,708, filed May 13, 2010, now U.S. Pat. No. 7,889,784, which is a continuation of U.S. application Ser. No. 12/477,742, filed Jun. 3, 2009, now U.S. Pat. No. 7,835,430, which is a continuation of U.S. application Ser. No. 10/619,691, filed Jul. 16, 2003, now U.S. Pat. No. 7,570,686, which is a continuation of U.S. application Ser. No. 09/755,173, filed Jan. 8, 2001, now U.S. Pat. No. 6,658,052, which claims the benefit of and priority under 35 U.S.C. §119(e) to U.S. Provisional Application No. 60/224,308, filed Aug. 10, 2000 entitled "Characterization of transmission lines using broadband signals in a multi-carrier DSL system," and U.S. Provisional Application No. 60/174,865, filed Jan. 7, 2000 entitled "Multicarrier Modulation System with Remote Diagnostic Transmission Mode", each of which are incorporated herein by reference in their entirety.

FIELD OF THE INVENTION

This invention relates to test and diagnostic information. In particular, this invention relates to a robust system and method for communicating diagnostic information.

BACKGROUND OF THE INVENTION

The exchange of diagnostic and test information between transceivers in a telecommunications environment is an important part of a telecommunications, such as an ADSL, deployment. In cases where the transceiver connection is not performing as expected, for example, where the data rate is low, where there are many bit errors, or the like, it is necessary to collect diagnostic and test information from the remote transceiver. This is performed by dispatching a technician to the remote site, e.g., a truck roll, which is time consuming and expensive.

In DSL technology, communications over a local subscriber loop between a central office and a subscriber premises is accomplished by modulating the data to be transmitted onto a multiplicity of discrete frequency carriers which are summed together and then transmitted over the subscriber loop. Individually, the carriers form discrete, non-overlapping communication subchannels of limited bandwidth. Collectively, the carriers form what is effectively a broadband communications channel. At the receiver end, the carriers are demodulated and the data recovered.

DSL systems experience disturbances from other data services on adjacent phone lines, such as, for example, ADSL, HDSL, ISDN, T1, or the like. These disturbances may commence after the subject ADSL service is already initiated and, since DSL for internet access is envisioned as an always-on service, the effect of these disturbances must be ameliorated by the subject ADSL transceiver.

SUMMARY OF THE INVENTION

The systems and methods of this invention are directed toward reliably exchanging diagnostic and test information between transceivers over a digital subscriber line in the presence of voice communications and/or other disturbances. For simplicity of reference, the systems and methods of the invention will hereafter refer to the transceivers generically as modems. One such modem is typically located at a customer premises such as a home or business and is "downstream" from a central office with which it communicates. The other modem is typically located at the central office and is "upstream" from the customer premises. Consistent with industry practice, the modems are often referred to as "ATU-R" ("ADSL transceiver unit, remote," i.e., located at the customer premises) and "ATU-C" ("ADSL transceiver unit, central office" i.e., located at the central office). Each modem includes a transmitter section for transmitting data and a receiver section for receiving data, and is of the discrete multitone type, i.e., the modem transmits data over a multiplicity of subchannels of limited bandwidth. Typically, the upstream or ATU-C modem transmits data to the downstream or ATU-R modem over a first set of subchannels, which are usually the higher-frequency subchannels, and receives data from the downstream or ATU-R modem over a second, usually smaller, set of subchannels, commonly the lower-frequency subchannels. By establishing a diagnostic link mode between the two modems, the systems and methods of this invention are able to exchange diagnostic and test information in a simple and robust manner.

In the diagnostic link mode, the diagnostic and test information is communicated using a signaling mechanism that has a very high immunity to noise and/or other disturbances and can therefore operate effectively even in the case where the modems could not actually establish an acceptable connection in their normal operational mode.

For example, if the ATU-C and/or ATU-R modem fail to complete an initialization sequence, and are thus unable to enter a normal steady state communications mode, where the diagnostic and test information would normally be exchanged, the modems according to the systems and methods of this invention enter a robust diagnostic link mode. Alternatively, the diagnostic link mode can be entered automatically or manually, for example, at the direction of a user. In the robust diagnostic link mode, the modems exchange the diagnostic and test information that is, for example, used by a technician to determine the cause of a failure without the technician having to physically visit, i.e., a truckroll to, the remote site to collect data.

The diagnostic and test information can include, for example, but is not limited to, signal to noise ratio information, equalizer information, programmable gain setting information, bit allocation information, transmitted and received power information, margin information, status and rate information, telephone line condition information, such as the length of the line, the number and location of bridged taps, a wire gauge, or the like, or any other known or later developed diagnostic or test information that may be appropriate for the particular communications environment. For example, the exchanged diagnostic and test information can be directed toward specific limitations of the modems, to information relating to the modem installation and deployment environment, or to other diagnostic and test information that can, for example, be determined as needed which may aid in evaluating the cause of a specific failure or problem. Alternatively, the diagnostic and test information can include the loop length and bridged tap length estimations as discussed in U.S. patent application Ser. No. 09/755,172, now U.S. Pat. No. 6,865,221, filed herewith and incorporated herein by reference in its entirety.

For example, an exemplary embodiment of the invention illustrates the use of the diagnostic link mode in the communication of diagnostic information from the remote terminal (RT) transceiver, e.g., ATU-R, to the central office (CO) transceiver, e.g., ATU-C. Transmission of information from the remote terminal to the central office is important since a typical ADSL service provider is located in the central office and would therefore benefit from the ability to determine problems at the remote terminal without a truck-roll. However, it is to be appreciated, that the systems and the methods of this invention will work equally well in communications from the central office to the remote terminal.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

Figure 1:
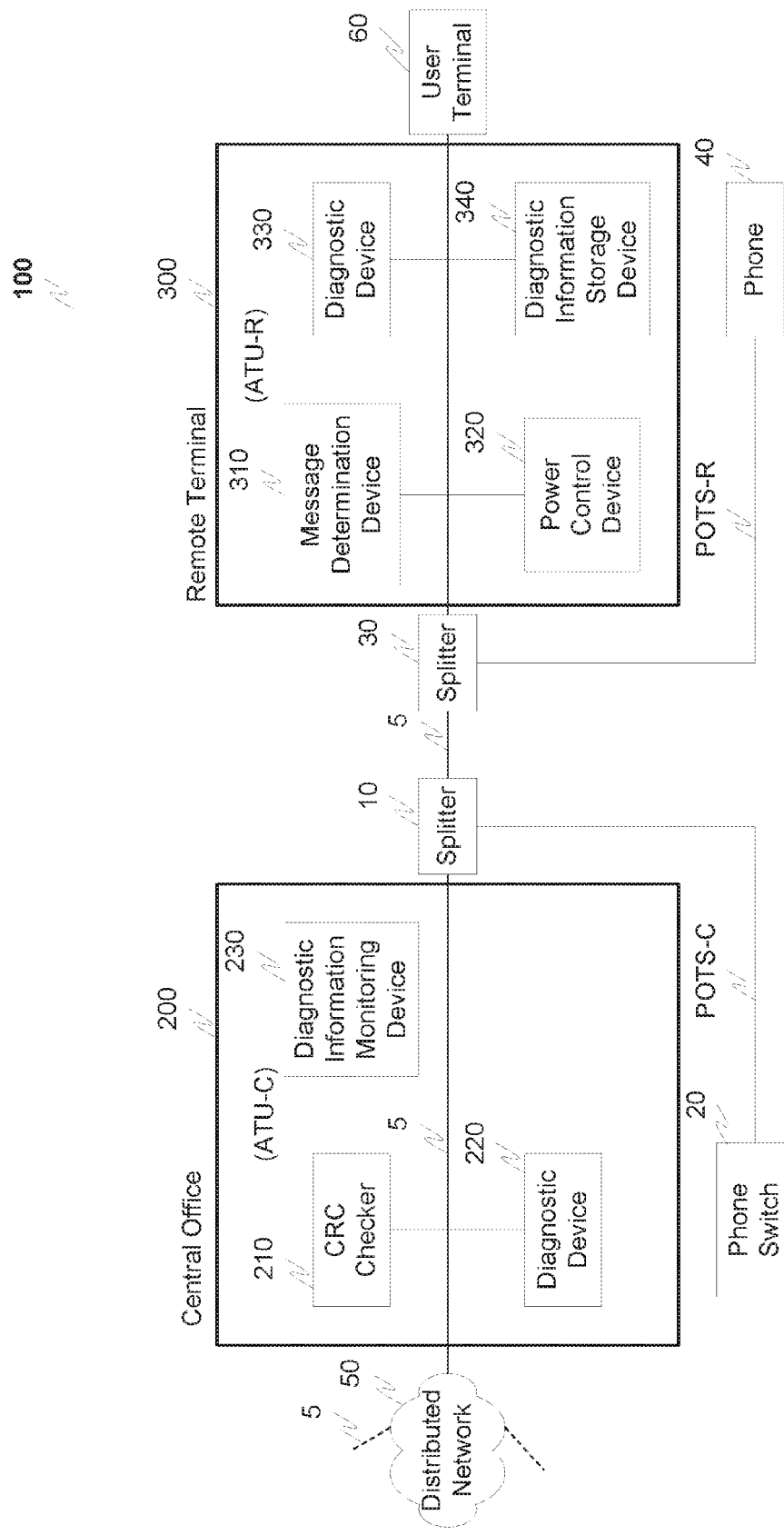
FIG. 1 is a functional block diagram illustrating an exemplary communications system according to this invention.

For ease of illustration the following description will be described in relation to the CO receiving diagnostic and test information from the RT. In the exemplary embodiment, the systems and methods of this invention complete a portion of the normal modem initialization before entering into the diagnostic link mode. The systems and methods of this invention can enter the diagnostic link mode manually, for example, at the direction of a technician or a user after completing a portion of initialization. Alternatively, the systems and methods of this invention can enter the diagnostic link mode automatically based on, for example, a bit rate failure, a forward error correction or a CRC error during showtime, e.g., the normal steady state transmission mode, or the like. The transition into the diagnostic link mode is accomplished by transmitting a message from the CO modem to the RT modem indicating that the modems are to enter into the diagnostic link mode, as opposed to transitioning into the normal steady state data transmission mode. Alternatively, the transition into the diagnostic link mode is accomplished by transmitting a message from the RT modem to the CO modem indicating that the modems are to enter into the diagnostic link mode as opposed to transitioning into the normal steady state data transmission mode. For example, the transition signal uses an ADSL state transition to transition from a standard ADSL state to a diagnostic link mode state.

In the diagnostic link mode, the RT modem sends diagnostic and test information in the form of a collection of information bits to the CO modem that are, for example, modulated by using one bit per DTM symbol modulation, as is used in the C-Rates1 message in the ITU and ANSI ADSL standards, where the symbol may or may not include a cyclic prefix. Other exemplary modulation techniques include Differential Phase Shift Keying (DPSK) on a subset or all the carriers, as specified in, for example, ITU standard G.994.1, higher order QAM modulation (>1 bit per carrier), or the like.

In the one bit per DMT symbol modulation message encoding scheme, a bit with value 0 is mapped to the REVERB1 signal and a bit with a value of 1 mapped to a SEGUE1 signal. The REVERB1 and SEGUE1 signals are defined in the ITU and ANSI ADSL standards. The REVERB1 signal is generated by modulating all of the carriers in the multicarrier system with a known pseudo-random sequence thus generating a wideband modulated signal. The SEGUE1 signal is generated from a carrier by 180 degree phase reversal of the REVERB1 signal. Since both signals are wideband and known in advance, the receiver can easily detect the REVERB1 and SEGUE1 signal using a simple matched filter in the presence of large amounts of noise and other disturbances.

TABLE 1

Exemplary Message Variables

Data Sent in the Diag Link
Train Type
ADSL Standard
Chip Type
Vendor ID
Code Version
Average Reverb Received Signal
Programmable gain amplifier (PGA) Gain - Training
Programmable gain amplifier PGA Gain - Showtime
Filter Present during Idle Channel Calculation
Average Idle Channel Noise
Signal to Noise during Training
Signal to Noise during Showtime
Bits and Gains
Data Rate
Framing Mode
Margin
Reed-Solomon Coding Gain
QAM Usage
Frequency Domain Equalizer (FDQ) Coefficients
Gain Scale
Time domain equalizer (TDQ) Coefficients
Digital Echo Canceller (DEC) Coefficients Table 1 shows an example of a data message that can be sent by the RT to the CO during the diagnostic link mode. In this example, the RT modem sends 23 different data variables to the CO. Each data variable contains different items of diagnostic and test information that are used to analyze the condition of the link. The variables may contain more than one item of data. For example, the Average Reverb Signal contains the power levels per tone, up to, for example, 256 entries, detected during the ADSL Reverb signal. Conversely, the PGA Gain—Training is a single entry, denoting the gain in dB at the receiver during the ADSL training.

Many variables that represent the type of diagnostic and test information that are used to analyze the condition of the link are sent from the RT modem to the CO modem. These variables can be, for example, arrays with different lengths depending on, for example, information in the initiate diagnostic mode message. The systems and methods of this invention can be tailored to contain many different diagnostic and test information variables. Thus, the system is fully configurable, allowing subsets of data to be sent and additional data variables to be added in the future. Therefore, the message length can be increased or decreased, and diagnostic and test information customized, to support more or less variables as, for example, hardware, the environment and/or the telecommunications equipment dictates.

Therefore, it is to be appreciated, that in general the variables transmitted from the modem being tested to the receiving modem can be any combination of variables which allow for transmission of test and/or diagnostic information.

FIG. 1 illustrates an exemplary embodiment of the additional modem components associated with the diagnostic link mode. In particular, the diagnostic link system 100 comprises a central office modem 200 and a remote terminal modem 300. The central office modem 200 comprises, in addition to the standard ATU-C components, a CRC checker 210, a diagnostic device 220, and a diagnostic information monitoring device 230. The remote terminal modem 300 comprises, in addition to the standard components associated with an ATU-R, a message determination device 310, a power control device 320, a diagnostic device 330 and a diagnostic information storage device 340. The central office modem 200 and the remote terminal model 300 are also connected, via link 5, to a splitter 10 for a phone switch 20, and a splitter 30 for a phone 40. Alternatively, the ATU-R can operate without a splitter, e.g., splitterless, as specified in ITU standard G.992.2 (G.lite) or with an in-line filter in series with the phone 40. In addition, the remote terminal modem 300, can also be connected to, for example, one or more user terminals 60. Additionally, the central office modem 200 can be connected to one or more distributed networks 50, via link 5, which may or may not also be connected to one or more other distributed networks.

While the exemplary embodiment illustrated in FIG. 1 shows the diagnostic link system 100 for an embodiment in which the remote terminal modem 300 is communicating test and diagnostic information to the central office 200, it is to be appreciated that the various components of the diagnostic link system can be rearranged such that the diagnostic and test information can be forwarded from the central office 200 to the remote terminal modem 300, or, alternatively, such that both modems can send and receive diagnostic and/or test information. Furthermore, it is to be appreciated, that the components of the diagnostic link system 100 can be located at various locations within a distributed network, such as the POTS network, or other comparable telecommunications network. Thus, it should be appreciated that the components of the diagnostic link system 100 can be combined into one device for respectively transmitting, receiving, or transmitting and receiving diagnostic and/or test information. As will be appreciated from the following description, and for reasons of computational efficiency, the components of the diagnostic link system 100 can be arranged at any location within a telecommunications network and/or modem without affecting the operation of the system.

The links 5 can be a wired or wireless link or any other known or later developed element(s) that is capable of supplying and communicating electronic data to and from the connected elements. Additionally, the user terminal 60 can be, for example, a personal computer or other device allowing a user to interface with and communicate over a modem, such as a DSL modem. Furthermore, the systems and method of this invention will work equally well with splitterless and low-pass mulitcarrier modem technologies.

In operation, the remote terminal 300, commences its normal initialization sequence. The diagnostic device 330 monitors the initialization sequence for a failure. If there is a failure, the diagnostic device 330 initiates the diagnostic link mode. Alternatively, a user or, for example, a technician at the CO, can specify that the remote terminal 300 enter into the diagnostic link mode after completing a portion of an initialization. Alternatively still, the diagnostic device 330 can monitor the normal steady state data transmission of the remote terminal, and upon, for example, an error threshold being exceeded, the diagnostic device 330 will initiate the diagnostic link mode.

Upon initialization of the diagnostic link mode, the diagnostic device 330, in cooperation with the remote terminal 300 will transmit an initiate diagnostic link mode message from the remote terminal to the central office 200 (RT to CO). Alternatively, the central office modem 200 can transmit an initiate diagnostic link mode message to the remote terminal modem 300. If the initiate diagnostic link mode message is received by the central office 200, the diagnostic device 330, in cooperation with the message determination device 310, determines a diagnostic link message to be forwarded to the central office 200. For example, the diagnostic link message can include test information that has been assembled during, for example, the normal ADSL initialization procedure. The diagnostic and/or test information can include, but is not limited to, the version number of the diagnostic link mode, the length of the diagnostic and/or test information, the communications standard, such as the ADSL standard, the chipset type, the vendor identifications, the ATU version number, the time domain received reverb signal, the frequency domain reverb signal, the amplifier settings, the CO transmitter power spectral density, the frequency domain received idle channel, the signal to noise ratio, the bits and gains and the upstream and downstream transmission rates, or the like.

If the initiate diagnostic link mode message is not received by the central office 200, the initiate diagnostic link mode message can, for example, be re-transmitted a predetermined number of iterations until a determination is made that it is not possible to establish a connection.

Assuming the initiate diagnostic link mode message is received, then, for a predetermined number of iterations, the diagnostic device 330, in cooperation with the remote terminal modem 300 and the diagnostic information storage device 340, transmits the diagnostic link message with a cyclic redundancy check (CRC) to the central office modem 200. However, it is to be appreciated that in general, any error detection scheme, such as bit error detection, can be used without affecting the operation of the system. The central office 200, in cooperation with the CRC checker 210, determines if the CRC is correct. If the CRC is correct, the diagnostic information stored in the diagnostic information storage device 340 has been, with the cooperation of the diagnostic device 330, and the remote terminal modem 300, forwarded to the central office 200 successfully.

If, for example, the CRC checker 210 is unable to determine the correct CRC, the diagnostic device 330, in cooperation with power control device 320, increases the transmission power of the remote terminal 300 and repeats the transmission of the diagnostic link message from the remote terminal 300 to the central office 200. This process continues until the correct CRC is determined by the CRC checker 210.

The maximum power level used for transmission of the diagnostic link message can be specified by, for example, the user or the ADSL service operator. If the CRC checker 210 does not determine a correct CRC at the maximum power level and the diagnostic link mode can not be initiated then other methods for determining diagnostic information are utilized, such as dispatching a technician to the remote site, or the like.

Alternatively, the remote terminal 300, with or without an increase in the power level, can transmit the diagnostic link message several times, for example, 4 times. By transmitting the diagnostic link message several times, the CO modem 200 can use, for example, a diversity combining scheme to improve the probability of obtaining a correct CRC from the received diagnostic link message(s).

Alternatively, as previously discussed, the central office 200 comprises a diagnostic information monitoring device 230. The remote terminal 300 can also include a diagnostic information monitoring device. One or more of these diagnostic information monitoring devices can monitor the normal steady state data transmission between the remote terminal 300 and the central office 200. Upon, for example, the normal steady state data transmission exceeded a predetermined error threshold, the diagnostic information monitoring device can initiate the diagnostic link mode with the cooperation of the diagnostic device 300 and/or the diagnostic device 220.

Figure 2:
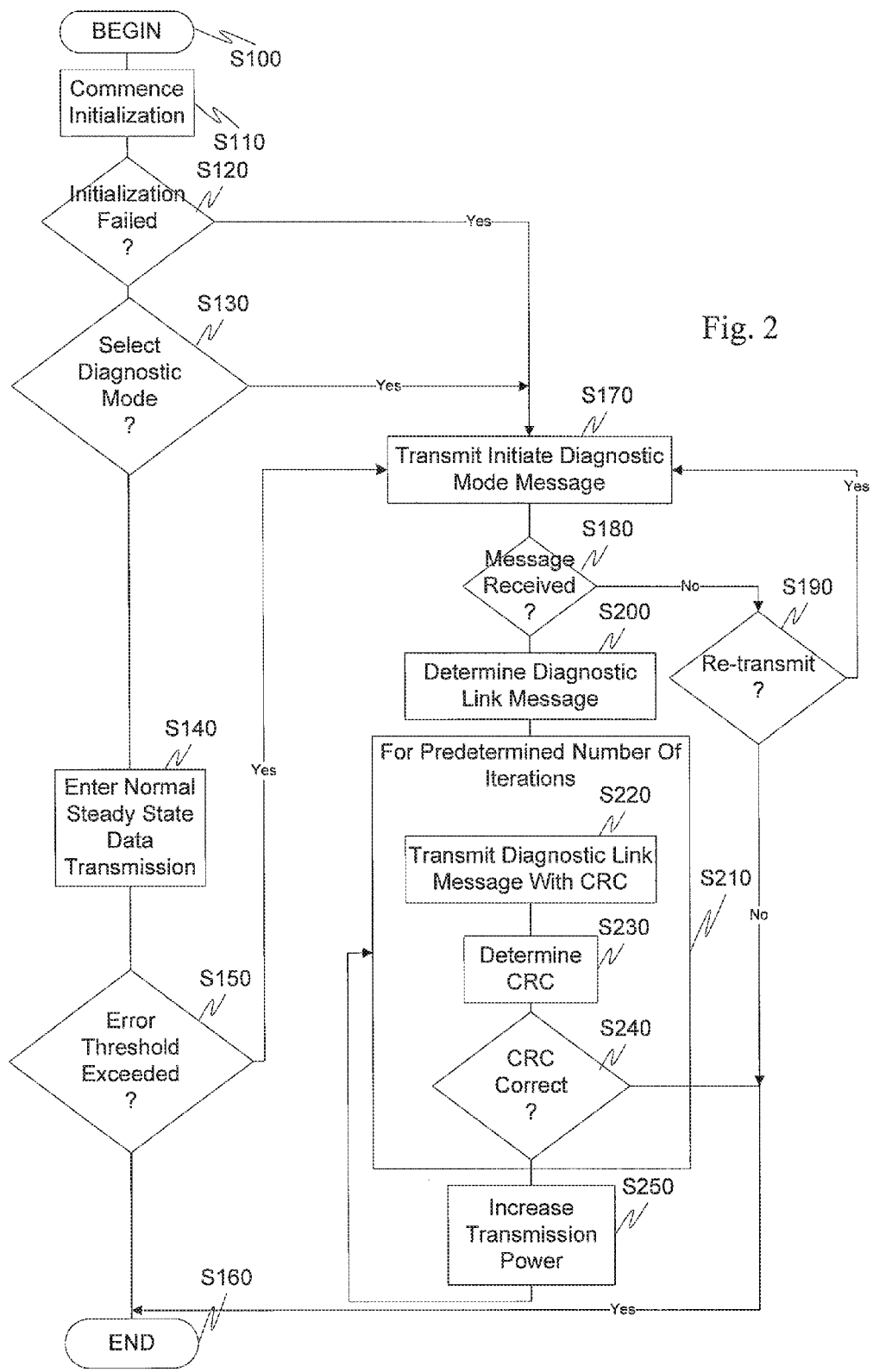
FIG. 2 is a flowchart outlining an exemplary method for communicating diagnostic and test information according to this invention.

FIG. 2 illustrates an exemplary method for entering a diagnostic link mode in accordance with this invention. In particular, control begins in step S100 and continues to step S110. In step S110, the initialization sequence is commenced. Next, in step S120, if an initialization failure is detected, control continues to step S170. Otherwise, control jumps to step S130. In step S130, a determination is made whether the diagnostic link mode has been selected. If the diagnostic link mode has been selected, control continues to step S170, otherwise, control jumps to step S140.

In step S170, the initiate diagnostic link mode message is transmitted from, for example, the remote terminal to the central office. Next, in step S180, a determination is made whether the initiate diagnostic mode message has been received by the CO. If the initiate diagnostic mode message has been received by the CO, control jumps to step S200. Otherwise, control continues to step S190. In step S190, a determination is made whether to re-transmit the initiate diagnostic mode message, for example, based on whether a predetermined number of iterations have already been completed. If the initiate diagnostic mode message is to be re-transmitted, control continues back to step S170. Otherwise, control jumps to step S160.

In step S200, the diagnostic link message is determined, for example, by assembling test and diagnostic information about one or more of the local loop, the modem itself, the telephone network at the remote terminal, or the like. Next, in step S210, for a predetermined number of iterations, steps S220-S240 are completed. In particular, in step S220 a diagnostic link message comprising a CRC is transmitted to, for example, the CO. Next, in step S230, the CRC is determined. Then, in step S240, a determination is made whether the CRC is correct. If the CRC is correct, the test and/or diagnostic information has been successfully communicated and control continues to step S160.

Otherwise, if step S210 has completed the predetermined number of iterations, control continues to step S250. In step S250, the transmission power is increased and control continues back to step S210. Alternatively, as previously discussed, the diagnostic link message may be transmitted a predetermined number of times, with our without a change in the transmission power.

In step S140, the normal steady state data transmission is entered into between two modems, such as the remote terminal and the central office modems. Next, in step S150, a determination is made whether an error threshold during the normal steady state data transmission has been exceeded. If the error threshold has been exceeded, control continues to step S170. Otherwise, control jumps to step S160. In step S160, the control sequence ends.

As shown in FIG. 1, the diagnostic link mode system can be implemented either on a single program general purpose computer, a modem, such as a DSL modem, or a separate program general purpose computer having a communications device. However, the diagnostic link system can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like, and associated communications equipment. In general, any device capable of implementing a finite state machine that is capable of implementing the flowchart illustrated in FIG. 2 can be used to implement a diagnostic link system according to this invention.

Furthermore, the disclosed method may be readily implemented in software using object or object-oriented software development environments that provide portable source code that can be used on a variety of computer, workstation, or modem hardware platforms. Alternatively, the disclosed diagnostic link system may be implemented partially or fully in hardware using standard logic circuits or a VLSI design. Other software or hardware can be used to implement the systems in accordance with this invention depending on the speed and/or efficiency requirements of the systems, the particular function, and a particular software or hardware systems or microprocessor or microcomputer systems being utilized. The diagnostic link system and methods illustrated herein however, can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods can be readily implemented as software executed on a programmed general purpose computer, a special purpose computer, a microprocessor, or the like. In these instances, the methods and systems of this invention can be implemented as a program embedded on a modem, such a DSL modem, as a resource residing on a personal computer, as a routine embedded in a dedicated diagnostic link system, a central office, or the like. The diagnostic link system can also be implemented by physically incorporating the system and method into a software and/or hardware system, such as a hardware and software systems of a modem, a general purpose computer, an ADSL line testing device, or the like.

It is, therefore, apparent that there is provided in accordance with the present invention, systems and methods for transmitting a diagnostic link message. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and the scope of this invention.

What is claimed is:
1. A diagnostic link system for communicating data between modems using multicarrier modulation comprising:
   an initiate diagnostic mode trigger that instructs a transmitting modem to forward an initiate diagnostic mode message to a receiving modem;

a message determination device that determines a diagnostic link message;

a receiving modem diagnostic device that receives the diagnostic link message and determines the accuracy of the diagnostic link message; and the transmitting modem further operable to transmit a message over a wired link upon the receiving modem determining that a predetermined error threshold has been exceeded, the message comprising an array comprising a plurality of elements, wherein each element comprises information associated with a received power level of at least one subchannel.

2. A multicarrier transceiver comprising:

a receiver portion operable to receive via a wired link;

a transmitter portion operable to transmit via the same wired link;

the receiver portion further operable to determine whether a predetermined error threshold during normal steady state data transmission over the wired link has been exceeded;

the receiver portion further operable to measure a received power level on each of a plurality of subchannels;

the receiver portion further operable to receive a message requesting information associated with the measurement of the received power level on each of a plurality of subchannels; and the transmitter portion further operable to transmit a message over the wired link upon the receiver portion determining that the predetermined error threshold has been exceeded, the message comprising an array comprising a plurality of elements, wherein each element comprises information associated with the received power level of at least one subchannel.

3. The multicarrier transceiver of claim 2, wherein the transceiver is DSL modem.

4. The multicarrier transceiver of claim 2, wherein the transceiver is customer premises modem.

5. The multicarrier transceiver of claim 2, wherein the transceiver is located in a central office.

6. The multicarrier transceiver of claim 2, wherein the transceiver is located in a customer premises.

7. The multicarrier transceiver of claim 2, wherein the transceiver is an ATU-R.

8. The multicarrier transceiver of claim 2, wherein the transceiver is ATU-C.

9. The multicarrier transceiver of claim 7, further wherein the transmitter portion is further operable to retransmit the message a plurality of times.

* * * * *